US006613262B1

(12) United States Patent
Arend

(10) Patent No.: US 6,613,262 B1
(45) Date of Patent: Sep. 2, 2003

(54) MOLDING SYSTEM WITH MOVABLE MOLD MODULES

(76) Inventor: Donald P. Arend, 7747 Aspenwood Dr. SE., Ada, MI (US) 49301

(*) Notice: Subject to any disclaimer, the term of this patent is extended or adjusted under 35 U.S.C. 154(b) by 284 days.

(21) Appl. No.: 09/702,446

(22) Filed: Oct. 31, 2000

(51) Int. Cl.$^7$ .............................................. B29C 45/10
(52) U.S. Cl. ................ 264/255; 264/297.2; 264/328.8; 425/112; 425/190; 425/576; 425/594
(58) Field of Search .............................. 264/255, 297.2, 264/328.8; 425/190, 112, 576, 589, 594

(56) References Cited

U.S. PATENT DOCUMENTS

| | | | |
|---|---|---|---|
| 3,465,387 A | 9/1969 | Allard et al. | |
| 3,951,579 A | 4/1976 | Myers et al. | 425/190 |
| 4,439,133 A | 3/1984 | Rees et al. | 425/556 |
| 4,504,208 A | 3/1985 | Kurumaji et al. | 425/589 |
| 4,571,169 A | 2/1986 | Shima et al. | 425/451.9 |
| 4,708,625 A | 11/1987 | Arend | 425/589 |
| 4,836,767 A | 6/1989 | Schad et al. | 425/552 |
| 4,874,309 A | 10/1989 | Kushibe et al. | 425/589 |
| 4,948,358 A | 8/1990 | Kushibe et al. | 425/574 |
| 4,984,980 A | 1/1991 | Ueno | 425/595 |
| 5,066,217 A | 11/1991 | Fukuzawa et al. | 425/589 |
| 5,238,389 A | 8/1993 | Brandau et al. | 425/522 |
| 5,238,394 A | 8/1993 | Hirata | 425/590 |
| 5,249,951 A | 10/1993 | Leonhartsberger et al. | 425/589 |
| 5,275,550 A | 1/1994 | Romi | 425/589 |
| 5,320,517 A | 6/1994 | Hirata et al. | 425/589 |
| 5,417,913 A | 5/1995 | Arend | 264/328.1 |
| 5,536,166 A | 7/1996 | Schad | 425/589 |
| 5,618,487 A | 4/1997 | Hettinga | 264/328.1 |
| 5,620,723 A | 4/1997 | Glaesener et al. | 425/589 |
| 5,645,865 A | 7/1997 | Schad et al. | 425/126.1 |
| 5,753,153 A | 5/1998 | Choi | 264/40.5 |
| 5,789,034 A | 8/1998 | Urbanek | 425/589 |
| 5,817,345 A | 10/1998 | Koch et al. | 425/130 |
| 5,868,989 A | 2/1999 | Glaesener et al. | 264/328.1 |
| 5,922,372 A | 7/1999 | Schad | 425/595 |
| 5,928,684 A | 7/1999 | Glaesener et al. | 425/589 |
| 5,928,685 A | 7/1999 | Schad | 425/595 |
| 6,120,722 A | 9/2000 | Schad | 264/328.1 |

OTHER PUBLICATIONS

Thinking Big, James D. Destafini, Molding Systems, pp. 14–19, Oct. 1998.
Injection Molding in Close Quarters, Diane L. Hallum, Molding Systems, pp. 20–26, Nov./Dec. 1997.
Hemscheidt 500H–3000H Brochure, entire brochure (year unknown).
Hemscheidt 50H–400H Brochure, entire brochure (year unknown).
Hemscheidt Technical Data Brochure (year unknown).
Husky Brochure, Injection Molding, Jan., 1999.
Husky Brochure, Injection Molding, May, 2000.

Primary Examiner—James P. Mackey
(74) Attorney, Agent, or Firm—Van Dyke, Gardner, Linn & Burkhart, LLP

(57) ABSTRACT

A mold apparatus provides a movable mold module which includes movable tie rods which are extendable and retractable with respect to the movable mold module of the mold apparatus, such that the tie rods may initially be removed from a gap between the platens of the mold apparatus when the platens have been separated. Preferably, the tie rod assemblies are movably mounted to the movable carriage or module, which also moves the injection machine and movable platen along a base toward and away from the fixed platen and corresponding mold part. Additionally, the tie rods may be extended relative to the movable platen as the platen is moved toward the fixed platen, such that the tie rods engage a locking member on the fixed platen to lock the platens relative to one another during the molding process. The tie rods are rotatable via a rotational device mounted at the movable platen, to rotate the tie rods and lock the tie rods to the locking member at the fixed platen. The fixed platen may also be rotatable relative to the base to allow booking of the fixed platen for easier and safer access thereto, and may include two or more platens and mold parts for simultaneously molding of additional products while one of the platens and mold parts are booked for access thereto. Two or more molding modules may also be provided around the rotatable fixed platen support with multiple platens and mold parts, such that multiple products may be molded simultaneously, or multi-colored products or multi-material products or the like may be molded, with portions of multiple products being simultaneously molded at each mold module or station around the rotatable platen support.

43 Claims, 35 Drawing Sheets

MOLDING SYSTEM WITH MOVABLE MOLD MODULES

BACKGROUND OF THE INVENTION

The present invention relates generally to molding machines, wherein mold parts and their platens are pressed and retained together during a molding process. Tie rods extend between and secure the mold part platens together during the molding process, and are separated to release the molding product. The present invention is especially applicable to large, high tonnage injection molding machines.

Injection molding devices or apparatuses typically include separable mold parts which are movable between open and closed positions. When the mold parts are closed together, a mold cavity is defined therebetween for receiving injected material, which is introduced therein in a fluid state under high pressure. After the injected material has hardened, the mold parts are opened or separated and the formed product is removed from one of the mold parts.

After a product is molded between the mold parts of a conventional molding machine, there is a down time or delay while the molded product is removed from the molding machine. The molding machine cannot mold a second product until the first molded product has been completely removed from the mold parts and the system is reset or realigned to mold the second product.

Also, because many molding machines remain aligned when the parts are separated, the operator may have to reach between the mold parts to remove the molded product and to prepare the mold parts for the next product. Therefore, it may be dangerous to remove the molded products from the mold parts of conventional molding machines, since an operator must reach or stand between the mold parts to access the molded product. U.S. Pat. No. 4,708,625 discloses a reaction injection molding (RIM) machine which books the platens and mold parts to provide safe access to the mold parts between molding processes.

Because the fluid material is injected into the mold part cavity under high pressure, the mold parts tend to separate during the molding process. As the size of the systems increase, the forces tending to separate the mold parts are correspondingly increased. Typically, the injection molding apparatus includes a platen at each of the mold parts. The tie rods extend between the platens and secure the platens relative to one another such that the mold parts are joined together, in order to resist the forces tending to separate the mold parts and platens during the molding process.

The tie rods extend a predetermined length from one of the mold parts and typically require a mold height adjustment in order to accommodate mold parts of different depths or heights. The tie rods are adjusted to extend an appropriate amount from one of the platens, such that when the two platens are moved to their engaged position, the tie rods extend a sufficient length for engaging and securing to the other platen. Typically, the mold height adjustment is accomplished via a mechanical adjustment of the tie rod. The tie rods are then extended the appropriate amount from the platen in which they are mounted.

Typically, the tie rods are positioned at various locations around the platens and may surround the mold parts. Because the tie rods typically are not movable with respect to one of the platens, the tie rods may interfere with access to the mold parts and the mold part cavity. This concern is even greater with larger injection molding apparatuses where a greater number of tie rods may be required to resist the forces tending to separate the mold parts. The position of the tie rods thus may result in limiting the size of a part which can be molded by a particular molding apparatus, and may further result in the removal of the molded part becoming a difficult and even dangerous process.

One proposed system is disclosed in U.S. Pat. No. 5,417,913, which provides tie rods which are movable relative to the platens, such that the tie rods may be spaced from the gap between the platens when the platens are separated. This allows for easier access to the mold parts when the platens and mold parts are separated.

When multiple colored or multiple layered items or products are molded by an injection molding machine, a single color or portion of the product or item is molded at one time. In such applications, multiple mold parts are typically spaced on one of the platens, whereby a color or portion of the product is shot or molded separately at each of the mold parts. The mold parts are then indexed so the next mold device can mold the second color or portion of the product. Because multiple mold parts for the different portions of the product are spaced on the platens of the molding apparatus, the size of the product must be small enough to utilize only a portion of the platen, in order to provide room for the other mold parts for other portions of the product about the platen. Furthermore, because the size of the mold part that is available for molding a product is determined by the size of the platens and by the position of the tie rods about the mold parts, a larger machine may be needed to mold multi-colored products or a given machine may be limited to molding smaller products. Accordingly, the process for molding multiple colors or layers of products may require removal of the partial product to place the partially molded product in a second mold cavity for subsequent molding of a second or third portion of the product.

Therefore, there is a need in the art for a molding apparatus which provides movable tie rods which are easily adjustable and movable to also provide clearance and access to the mold part platens when the platens are separated. The tie rods should also be adjustable to account for mold height variation for different mold parts. Also, there is a need for a molding apparatus which provides safe and easy access to the mold parts between molding processes. There is a further need in the art for a molding apparatus which is capable of molding multicolored parts in an efficient and effective manner.

SUMMARY OF THE INVENTION

The present invention is intended to provide a molding apparatus which provides movable tie rods which are retractable such that the tie rods are removed from the gap between the mold platens when the mold platens are separated, thereby easing access to the mold parts. The present invention is also intended to provide a molding machine which enhances access to the molded product via booking of a fixed platen for access to the molded product. The present invention may also provide simultaneous molding of a second product while the first product is booked for removal, thereby increasing the efficiency of the system.

According to an aspect of the present invention, a mold assembly for molding products between a pair of mold parts comprises a support base, a fixed platen support positioned at a first end of the support base, and at least one movable mold module which is movably supported along the support base toward and away from the fixed platen support. The fixed platen support includes at least one fixed platen which supports one of the pair of mold parts. The movable mold module includes a movable platen carriage, which supports a movable platen, which further supports the other of the pair of mold parts. The movable platen carriage is movable along the support base toward and away from the fixed platen support. The movable platen is movable between an engaged position, where the mold parts are engaged together for molding, and a separated position, where the mold parts and platens are separated. The movable mold module further includes at least one tie rod assembly movably mounted at the movable platen carriage. The tie rod assembly is movable with respect to the movable and fixed platens. The tie rod assembly is initially removed from proximity of the mold parts when the mold parts and platens are separated and is movable along the movable platen carriage to extend from the movable platen carriage and engage the fixed platen support to maintain engagement of the platens and the mold parts during the molding process.

Preferably, the tie rod assemblies are mounted to a tie rod carriage which is movable along the movable platen carriage to move the tie rod assemblies relative to the movable platen carriage and the platens. Preferably, each of the tie rod assemblies comprises a tie rod, which extends from a piston within an hydraulic cylinder, which is mounted to the tie rod carriage. The piston and tie rod are movable relative to the cylinder via pressurized hydraulic fluid to adjust a length of the tie rod extending from the cylinder for a mold height adjustment. The tie rods extend from the tie rod carriage and the movable platen and are insertable at least partially through the fixed platen. Preferably, the pistons and tie rods are rotatable relative to the cylinder and tie rod carriage to lock the tie rods to the fixed platen after they have been engaged therewith.

In one form, the movable platen carriage is movable along the support base with an injector carriage which supports an injection machine thereon. Alternately, a reaction injection molding machine may be positioned at or remote from the movable platen carriage.

In one form, the fixed platen support includes at least two fixed platens and is pivotable to align one of the fixed platens with the movable platen, while allowing access to the other of the fixed platens. The assembly may further comprise two or more movable mold modules, whereby the fixed platen support is pivotable to align the fixed platens with a corresponding one of the movable mold modules. By the term "fixed" platen, it is meant that the platen is "fixed" during the molding processes and is not movable toward and away from the other, movable platen of the molding apparatus, although the "fixed" platen may be pivotable or movable between molding processes to cycle the fixed platens between multiple mold stations and/or access stations. Preferably, the fixed platen support is pivotable to pivot a partially molded product and corresponding mold part and first fixed platen from one of the movable mold modules to a next one of the movable mold modules, whereby a different color or portion of the product is molded between the respective mold part of the next movable mold modules and the mold part of the first fixed platen.

According to another aspect of the present invention, a molding assembly for molding items with an injection machine comprises a support base, at least one movable platen which is movable along at least a portion of the support base, and a fixed platen support structure which supports at least two fixed platens. The fixed platen support structure is pivotally mounted to the support base and is pivotable about a generally vertical axis to align at least one of the fixed platens with at least one of the movable platens, while another of the fixed platens is either aligned with another movable platen or booked for access thereto. In one form, the molding assembly includes at least two movable platens, each of which is movable along a different portion of the support base toward and away from the fixed platen support. Optionally, the fixed platen support is pivotable to move one of the fixed platens from one of the movable platens to another of the movable platens, whereby a different layer or portion of an item being molded by the molding assembly is molded at each of the movable platens. Preferably, the molding assembly includes at least one tie rod which is engagable between the movable platen and at least one of the fixed platens to secure the platens relative to one another during the molding process.

According to yet another aspect of the present invention, a method for molding multiple portions of a product or item in a molding machine comprises providing a molding machine, which includes a base, a fixed platen support movably or pivotally mounted at the base, and first and second movable platens movably mounted at a respective portion of the base and movable therealong toward and away from the fixed platen support. The fixed platen support includes first and second fixed platens mounted thereon and is movable to move the first and second fixed platens between aligned positions with the first and second movable platens. A first product or portion of a product is molded between the first movable platen and the first fixed platen. The fixed platen support is then moved or pivoted to move the first fixed platen and the first product from alignment with the first movable platen. A second product or portion of a product is molded between the second movable platen and the first or second fixed platen.

In one form, the molding machine may be operable to mold different products generally simultaneously between the respective movable and fixed platens. The fixed platen support is movable or rotatable to move the molded product to an access station after the product is molded.

In another form, the molding machine molds first and second portions of a product, such that the first portion is molded between the first fixed platen and the first movable platen, and the second portion is molded between the first fixed platen and second movable platen. After both portions are molded, the fixed platen support is then pivoted to move the first fixed platen and the molded item away from the first and second movable platens for removal of the molded item. Preferably, a first portion of another item is molded between the first movable platen and the second fixed platen while the second portion of the first item is being molded between the second movable platen and the first fixed platen.

According to another aspect of the present invention, a mold assembly for molding products with a molding machine comprises a first platen and a second platen and at least one tie rod assembly. The tie rod assembly includes an hydraulic cylinder movably mounted at the first platen. The first and second platens are oppositely facing one another and support a respective mold part thereon. The platens are movable relative to each other between an engaged position for molding an item between the mold parts and a retracted position, whereby a gap is between the platens and the mold parts. The tie rod assembly includes a piston which is movable within and along the cylinder and includes a tie rod extending from one end of the piston. The tie rod assembly is initially retracted and remote from the gap between the platens when the platens are in the retracted position. The cylinder is movable relative to the first platen to move the tie rod to an extended position, whereby the tie rod is moved toward the second platen and may lock the first and second platens in the engaged position. The piston and tie rod are rotatable relative to the cylinder to lock the tie rod at the second platen. The piston of the tie rod assembly is also longitudinally adjustable relative to the cylinder to adjust an amount of extension of the tie rod from the cylinder to account for a thickness or depth of mold parts and/or a separation of the first and second platens when in the engaged position. Preferably, the second platen is generally fixedly mounted to a base and the first platen is mounted to a movable support which is movable along the base. The movable support is movable to move the first platen between the separated position and the engaged position with respect to the second platen. Preferably, the tie rod assembly is movably positioned at the movable support.

Therefore, the present invention provides a molding apparatus which includes an injector and tie rods on a single movable mold module which engages a fixed platen at a fixed platen support. The fixed platen support may be movable or pivotable to align fixed platens with one or more movable mold modules, whereby multiple layers or portions of items or multiple items may be simultaneously molded at different stations of the mold assembly, thereby substantially improving the efficiency of the molding apparatus. Preferably, multiple items or portions of items may be molded simultaneously at different stations positioned around a single fixed platen support which includes multiple platens thereon. The fixed platen support may be movable or pivotable to move the portions of the parts from the movable mold module and injector to the next mold module or to move each completed item from a movable mold module to an insert or access station for easy access to the molded product. The tie rods are movable with respect to the movable platens and thus may be removed from proximity to the mold parts when the mold parts and platens are separated, thereby improving access to the mold parts between the molding processes.

DETAILED DESCRIPTION OF THE PREFERRED EMBODIMENTS

Figure 1:
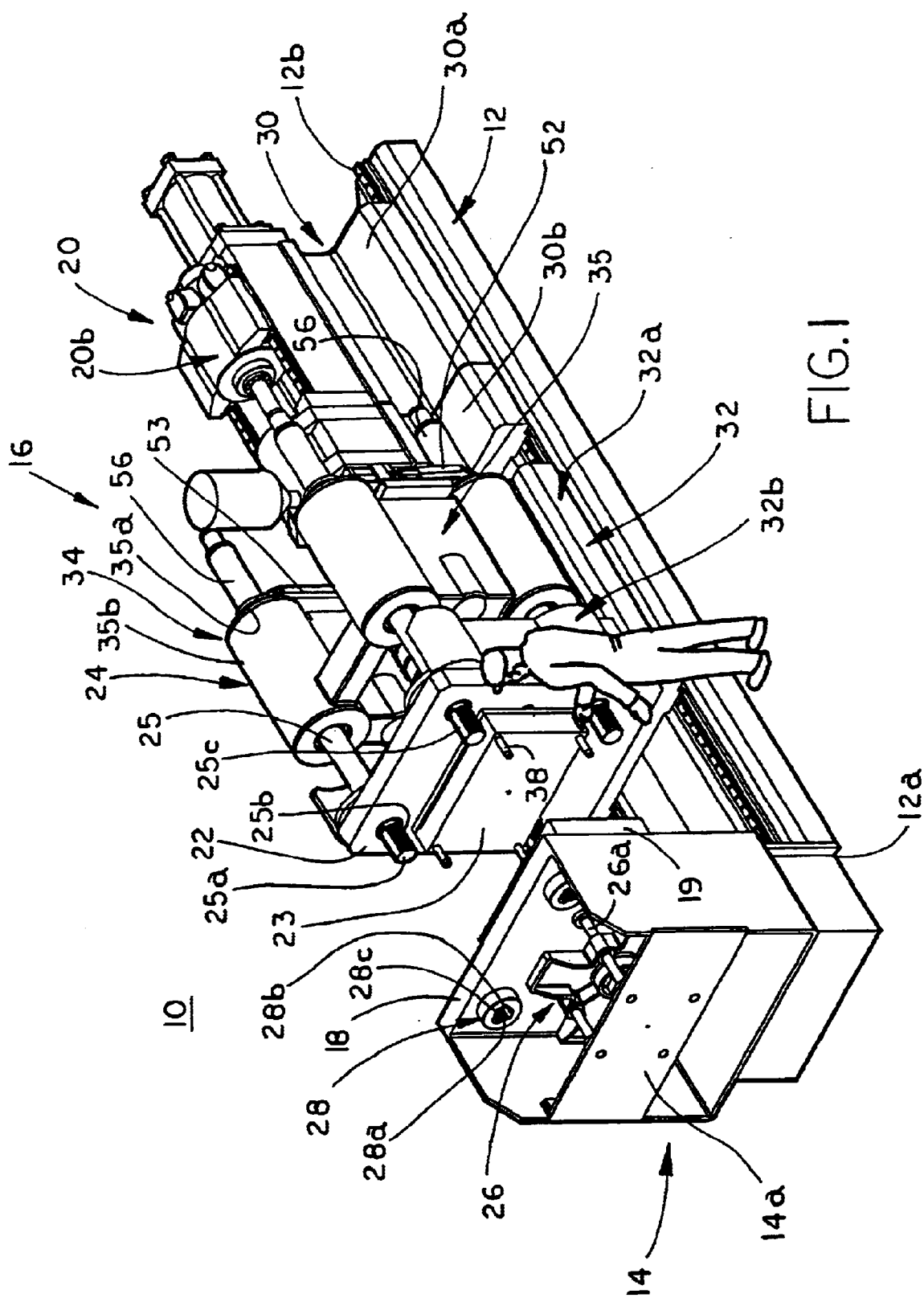
FIG. 1 is a perspective view of a molding apparatus in accordance with the present invention, with the mold platens separated and tie rods retracted.

Referring now specifically to the drawings and the illustrative embodiments depicted therein, a molding apparatus 10 includes a support base 12, a fixed platen support 14 and a movable mold carriage or mold support module 16 (FIG. 1). Fixed platen support 14 includes a fixed platen 18, which further supports a mold part 19 thereon. Movable carriage/or module 16 movably supports an injection unit or injection molding machine 20 and a movable platen 22, which are movable with module 16 toward and away from fixed support 14. Movable platen 22 includes a second mold part 23 mounted thereon. Movable carriage 16 is movable along base 12 to separate and engage mold parts 19 and 23 for molding a product or item within a mold cavity defined between the mold parts. A plurality of tie rod assemblies 24 are movably mounted on movable module 16 and are extendable and retractable with respect to movable platen 22. Tie rod assemblies 24 are initially retracted, as shown in FIGS. 1–6, such that they are remotely positioned from a gap between the mold parts and platens when the platens are separated. Tie rod assemblies 24 are movable along module 16 and thus extendable to engage or lock one or more tie rods 25 to the fixed platen support 14 to secure mold parts 19 and 23 together during the molding process, as discussed below.

Injection machine 20 is operable to inject a hardenable material into the mold cavity defined by and between mold parts 19 and 23 under high pressure to completely fill the cavity. Injection machine 20 preferably includes conventional components that operate in a known manner to inject the molding material. Because injection unit 20 preferably has the components of a conventional injection unit or machine, which are known and commercially available, a detailed description of the injection unit will not be included herein. Briefly, the injection unit 20 includes an injector barrel 20a and an injector 20b, which forces the fluid material through barrel 20a via an injection screw 20c (FIG. 3) into the mold cavity when the mold parts 19 and 23 are secured together by tie rod assemblies 24. The material injected through the injector barrel may be any known synthetic plastic, aluminum, zinc or white metal or the like, or may be any other material capable of being injection molded, without affecting the scope of the present invention. Injection unit 20 is a large, high tonnage injection machine and is capable of injecting the material at very high pressures, such as five tons per square inch or more. Preferably, mold parts 19 and 23 are large enough in size to mold large items or products, such as panels, fenders, doors or bumpers for vehicles and the like.

Figure 3:
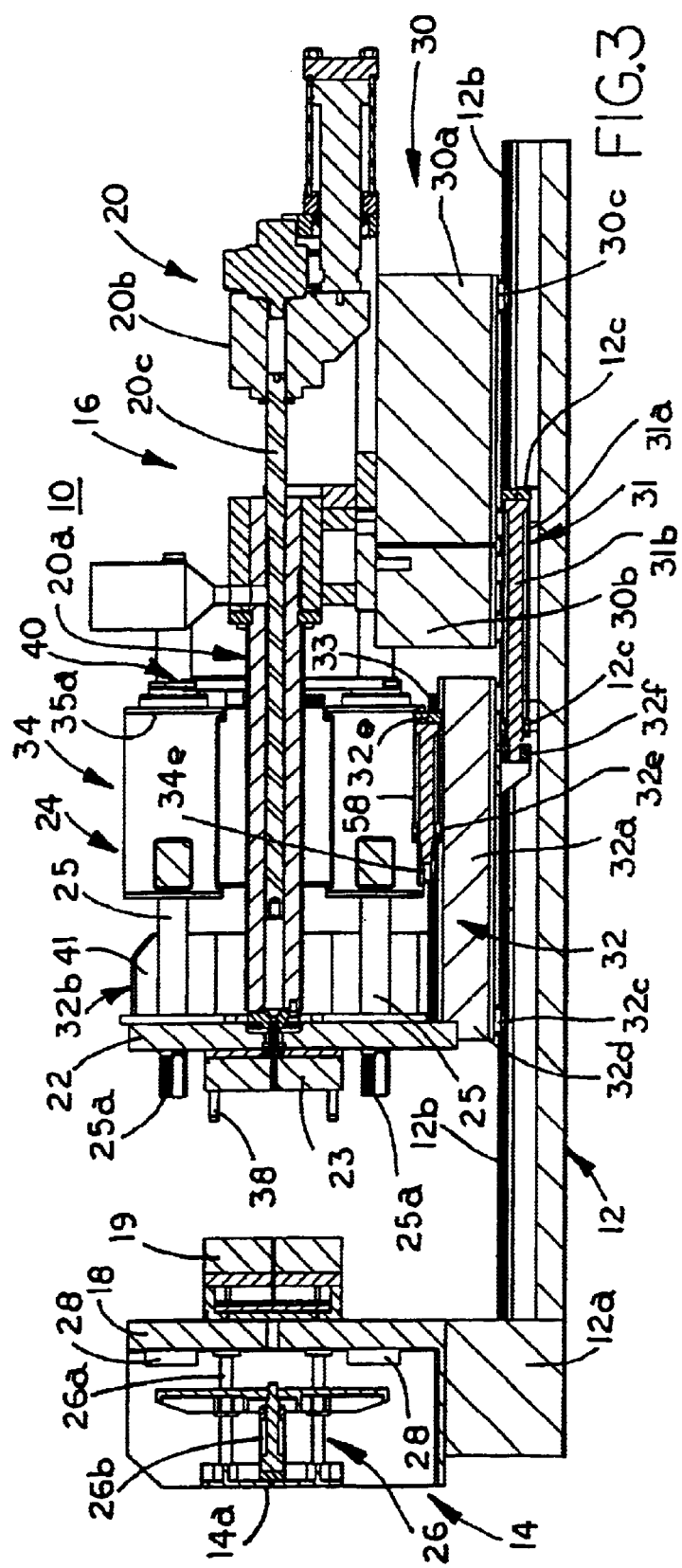
FIG. 3 is a sectional view of the molding apparatus taken along the line III—III in FIG. 2.

Support base 12 is a generally longitudinally extending base with fixed platen support 14 mounted at an end 12a thereof. Support base 12 further includes a pair of rails or guides 12b extending longitudinally along each side of base 12 upon which movable carriage 16 slides or otherwise moves toward and away from fixed platen support 14, as discussed below. However, movable platen carriage 32 and/or injector carriage 30 of movable carriage 16 may move or slide along base 12 via other movable means, such as, for example, rollers, wheels, sliding plates or shoes, or the like, which facilitate translational movement of the carriage or carriages relative to the base, without affecting the scope of the present invention. As shown in FIG. 3, base 12 also includes actuator mounting brackets or flanges 12c for mounting an actuator 31, which is operable to move mold module 16 along base 12, as also discussed below.

Figure 4:
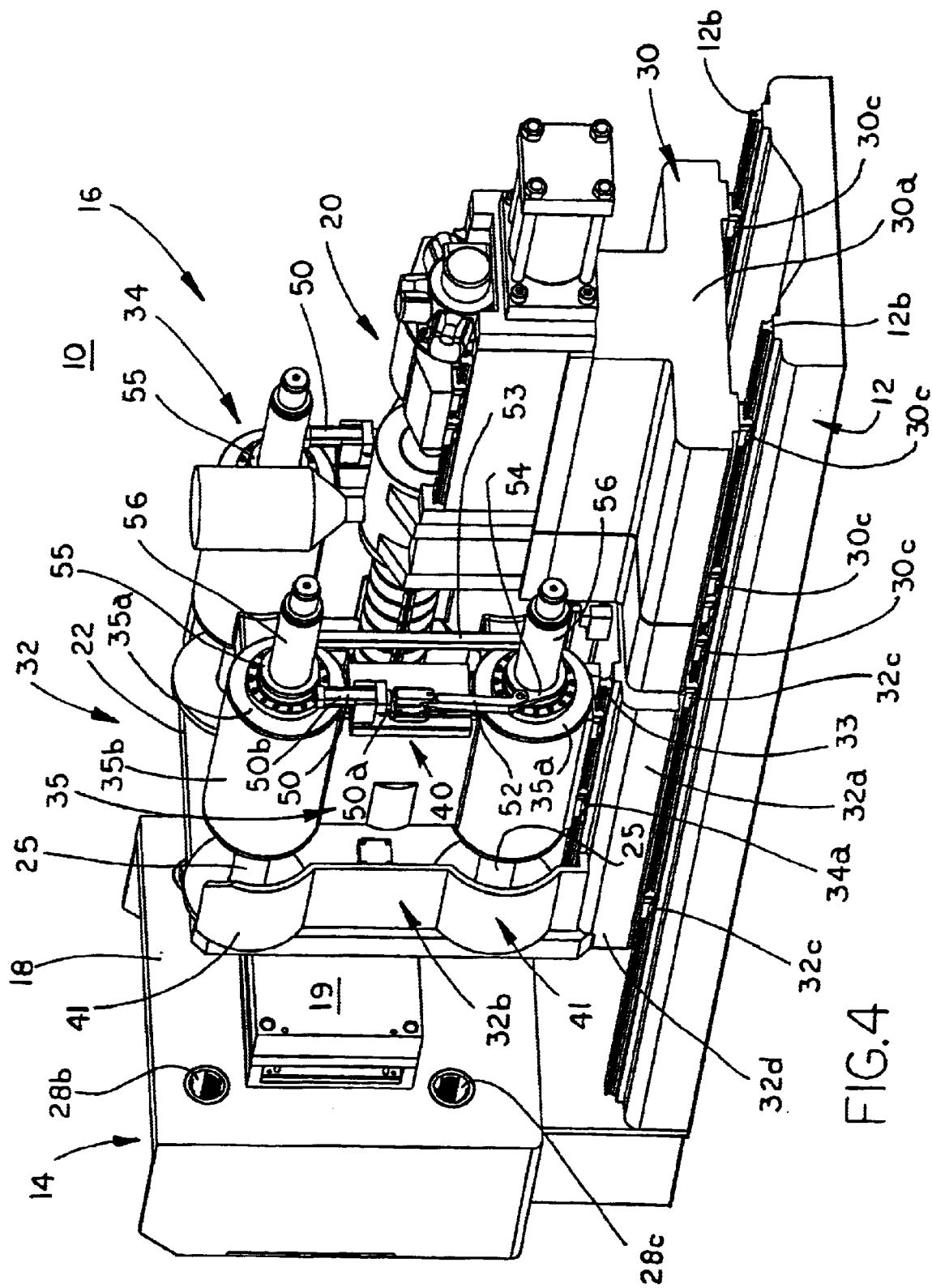
FIG. 4 is another perspective view of the mold apparatus of FIGS. 1–3.
Figure 5:
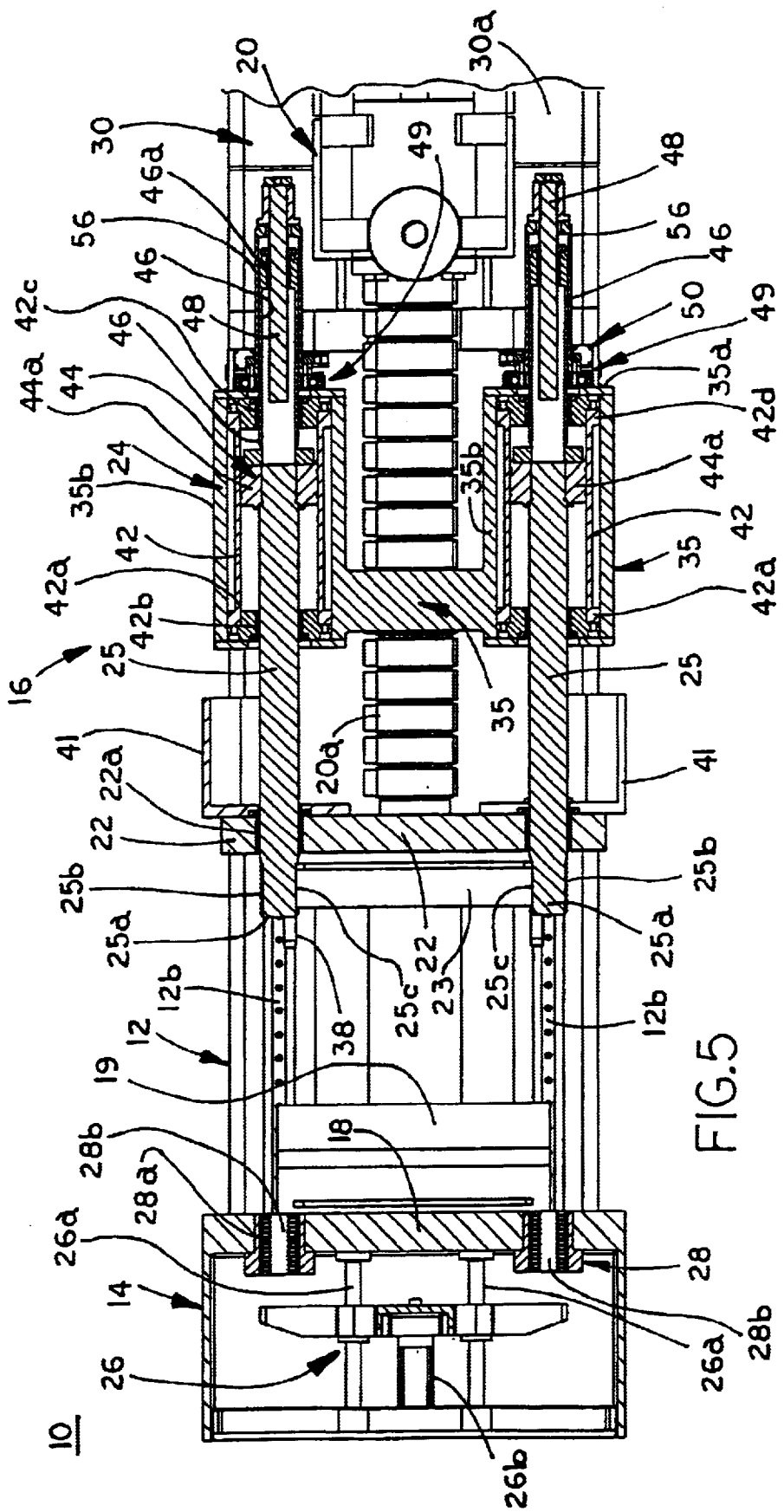
FIG. 5 is a top plan view and partial sectional view of the mold apparatus of FIGS. 1–4.

Fixed platen support 14 includes fixed platen 18 at one end and a frame or panel 14a opposite fixed platen 18. An ejector mechanism 26 (FIGS. 1–3 and 5) is mounted between panel 14a and fixed platen 18 and functions to extend and retract a plurality of rods 26a into mold part 19, in order to eject a completed molded product from mold part 19. After the molding process is complete, the rods are extended via actuation of an hydraulic cylinder 26b, as is known in the molding arts. Additionally, fixed platen support 14 includes a plurality of locking members 28 which are provided through fixed platen 18 and spaced around mold part 19. Locking members 28 are preferably reinforced, partially threaded openings which extend through fixed platen 18, with a plurality of partial threads 28a positioned along non-threaded portions 28b of a passageway 28c (as best shown in FIGS. 1, 4 and 5). Locking members 28 are correspondingly formed with the ends 25a of tie rods 25, such that tie rods 25 may insert at least partially through passageway 28c and rotate to engage partial threads 25b on tie rods 25 with the threads 28a within passageway 28c of locking members 28, to lock the tie rods therein, as discussed below.

Figure 2:
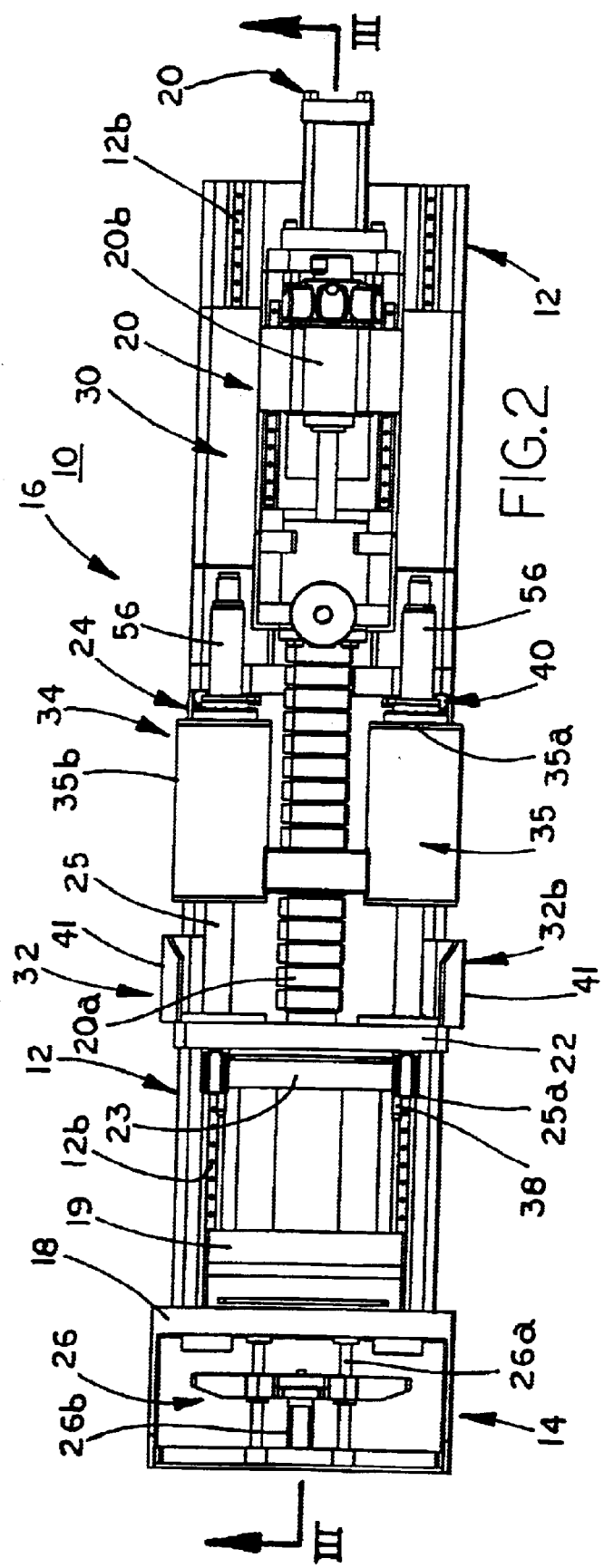
FIG. 2 is a top plan view of the molding apparatus of FIG. 1.
Figure 11:
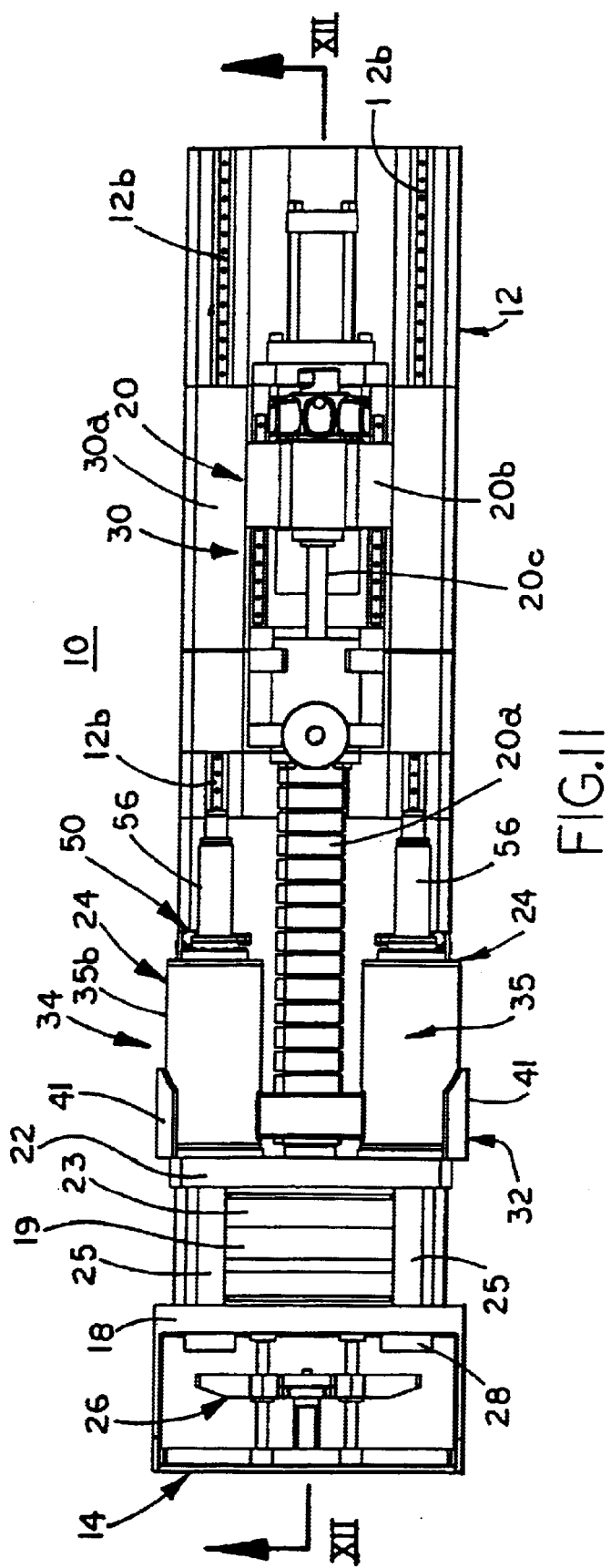
FIG. 11 is a top plan view of the mold apparatus, with the tie rods extended and engaged with the fixed platen.

Movable support module 16 preferably includes an injector carriage 30 and a movable platen carriage 32 which are slidable together along rails 12b of support base 12. Injection machine 20 is mounted on injector carriage 30, with injector barrel 20a extending from one end 30b of injector carriage 30 and across movable platen carriage 32 for engagement with an opening in movable platen 22 for communication of the pressurized fluid material into the cavity defined by mold parts 19 and 23 when they are secured together, as can be seen in FIGS. 2 and 11. A base portion 30a of injector carriage 30 includes a plurality of slide members 30c which slidably engage rails 12b of base 12, as discussed below.

Movable platen carriage 32 includes a base portion 32a and movable platen 22, which is mounted at a forward end 32d of base portion 32a and extends vertically upwardly therefrom. Movable platen carriage 32 further includes a support or guide portion 32b for supporting and guiding a tie rod carriage 34 along base portion 32a. A pair of rails or guides 33 (FIGS. 3 and 4) are preferably positioned along an upper portion of base portion 32a of movable platen carriage 32 for slidably or movably supporting tie rod carriage 34 therealong. Preferably, guide portion 32b of movable platen support or carriage 32 includes a plurality of generally cylindrical guide walls 41 positioned at movable platen 22, for guiding and supporting the cylindrical frame portions 35b of a frame or support structure 35 of tie rod carriage 34 as the tie rod carriage 34 is moved along rails 33 of carriage 32, toward and away from movable platen 22, as discussed below. Movable platen carriage 32 also preferably includes a plurality of slide or rail members 32c positioned along a lower surface of each side of base portion 32a of platen carriage 32, for slidable engagement with rails 12b of support base 12 (FIG. 4).

Preferably, injector carriage 30 is connectable to movable platen carriage 32, such that both carriages 30, 32 are movable together along rails 12b of support base 12 so that injector barrel 20a remains connected to the opening in movable platen 22 throughout the molding process. Preferably, movable mold module 16 is movable along the rails 12b of support base 12 via extension and retraction of at least one actuator 31, such as an hydraulic cylinder or the like, interconnected between one or both of the carriages 30 and/or 32 and support base 12. For example, as shown in FIG. 2, actuator 31 may be an hydraulic cylinder having a cylinder portion 31a mounted between brackets 12c at base 12 and a rod portion 31b mounted at a corresponding bracket 32f at a lower portion of movable platen carriage 32. However, the actuator 31 may be connected to injector carriage 30, or separate actuators may be connected between base 12 and injector carriage 30, and between base 12 and movable platen carriage 32, to independently move the carriages 30, 32 along base 12, without affecting the scope of the present invention.

Figure 12:
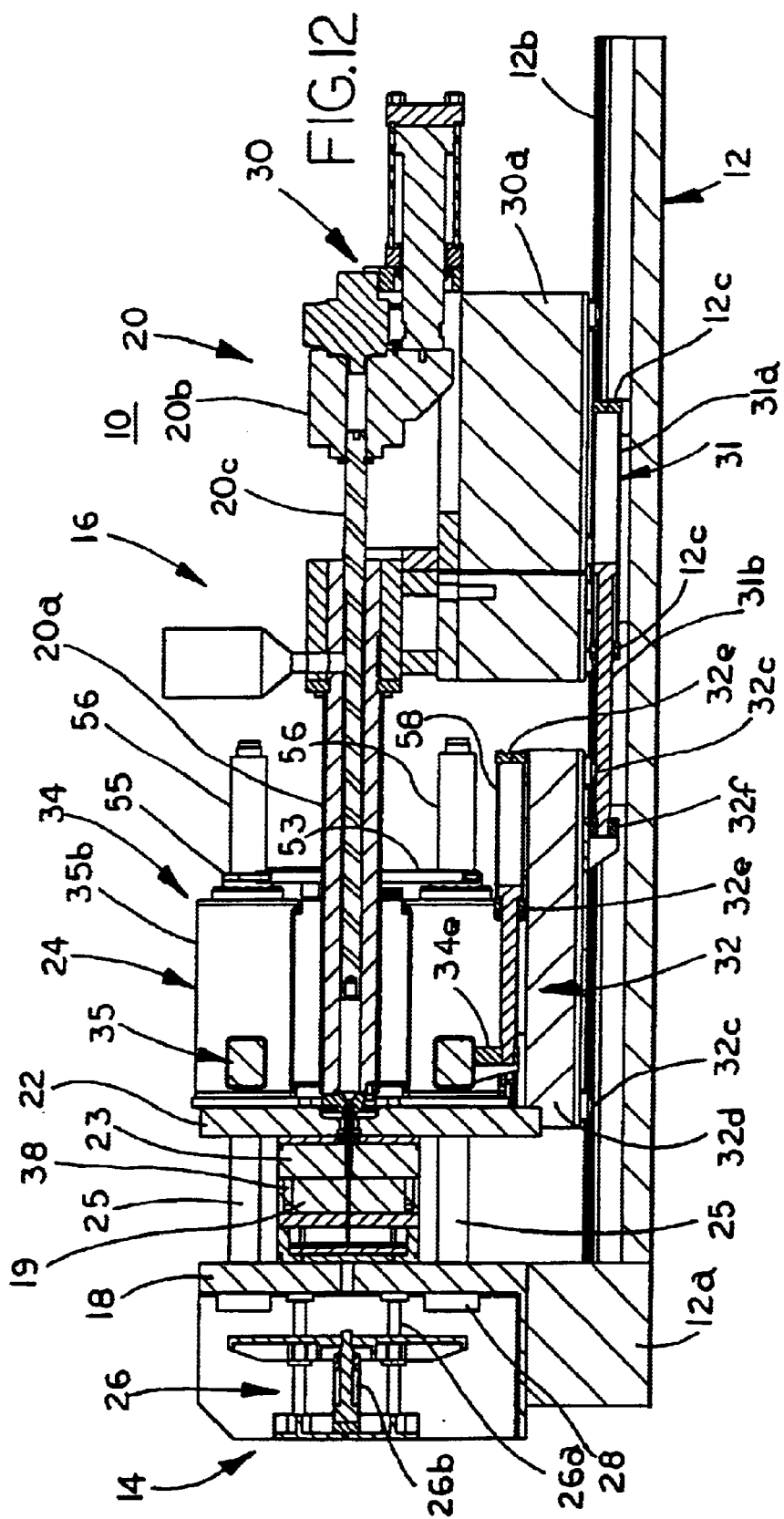
FIG. 12 is a sectional view similar of the mold apparatus, taken along the line XII—XII in FIG. 11.
Figure 13:
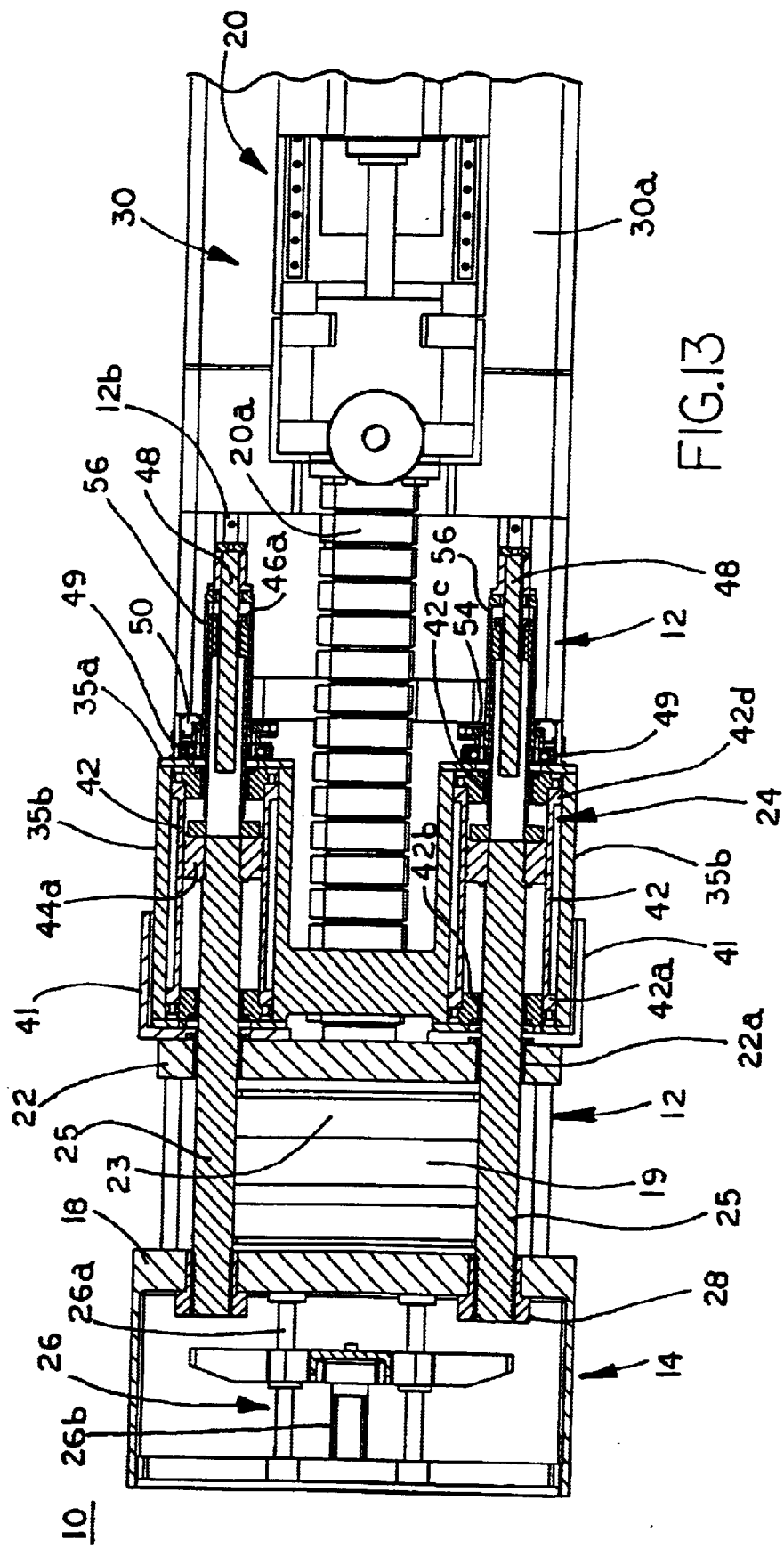
FIG. 13 is a top plan view and partial sectional view of the mold apparatus of FIGS. 11 and 12.

As best shown in FIG. 4, tie rod carriage 34 preferably includes a plurality of rail or slide members 34a (FIG. 4) positioned along a lower surface of each side of frame 35 of tie rod carriage 34, for slidably engaging rails 33 of movable platen carriage 32. Frame 35 of tie rod carriage 34 also includes an actuator mounting bracket 34e (FIGS. 3 and 12), while movable platen carriage 32 further includes an actuator mounting bracket or flange 32e positioned along an upper surface of base portion 32a (FIGS. 3 and 12). Similar to actuator 31, an actuator 58, such as an hydraulic cylinder, is mounted between tie rod carriage 34 and movable platen carriage 32 via mounting brackets 34e and 32e, such that extension or retraction of actuator 58 causes a corresponding movement of tie rod carriage 34 along movable platen carriage 32. Support frame 35 of tie rod carriage 34 mounts and supports the plurality of tie rod assemblies 24 to tie rod carriage 34, such that movement of tie rod carriage 34 relative to movable platen carriage 32 results in corresponding relative movement of the entire tie rod assemblies 24.

Tie rod carriage 34 is thus movable relative to movable platen carriage 32 via slidable engagement of slide members 34a of tie rod carriage 34 with rails 33 of movable platen carriage 32, which is further movable relative to support base 12 and fixed platen support 14 via slidable engagement of slide members 32c along rails 12b. Tie rod carriage 34 is movable along rails 33 relative to movable platen carriage 32 to move the tie rods 25 from an initial spaced or open position, where the tie rods are removed from the gap between the separated mold parts, as shown in FIGS. 1–6, and an engaged or extended position, where the tie rods extend from movable platen 22 for engagement and securement with fixed platen 18, as shown in FIGS. 11–16. Similar to movable carriage and base 12, tie rod carriage 34 may be movable along movable platen carriage 32 via other movable means, without affecting the scope of the present invention.

Figure 6:
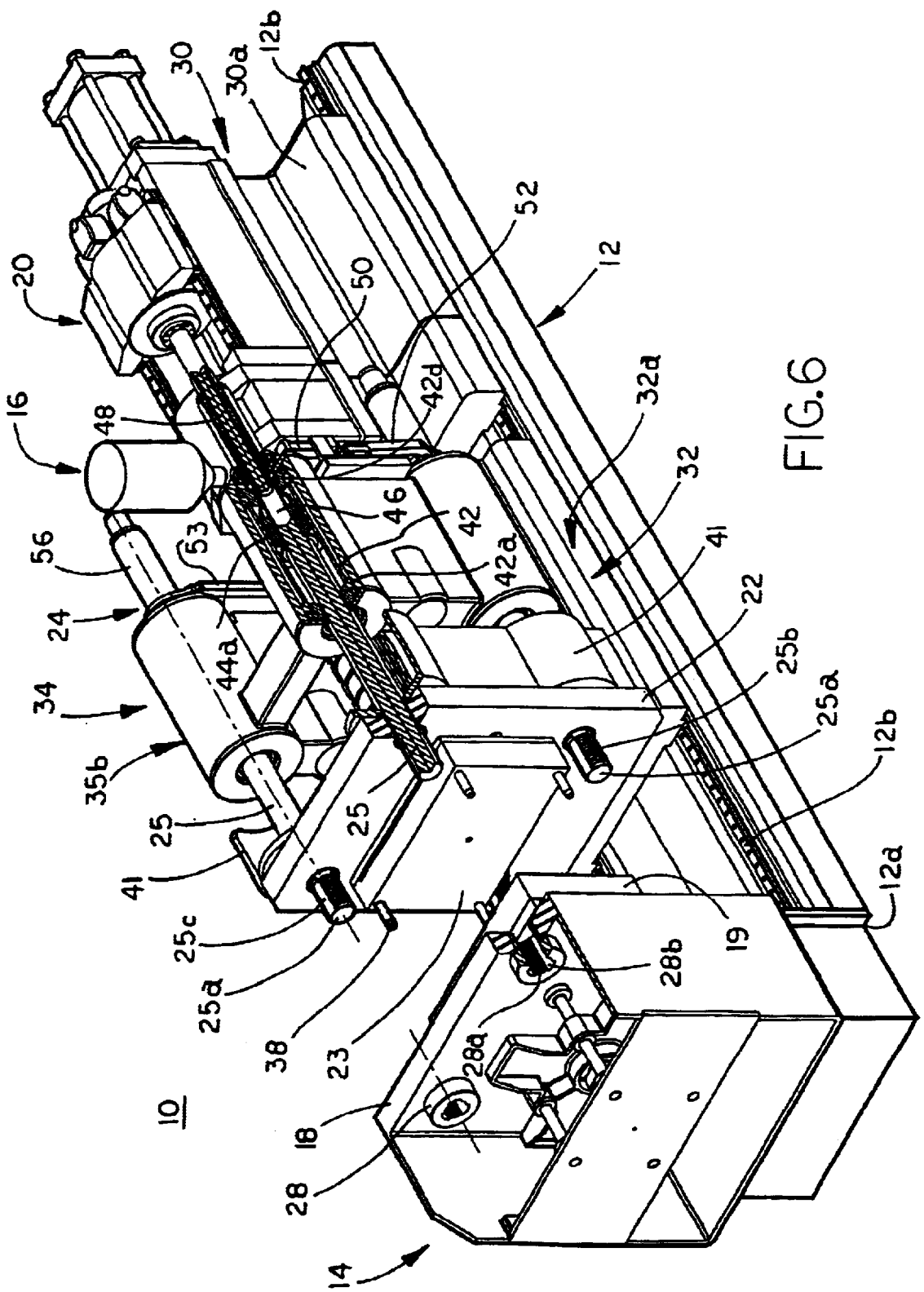
FIG. 6 is a perspective view similar to FIG. 1, with a portion of the tie rod assembly cut away to show additional details thereof.
Figure 7:
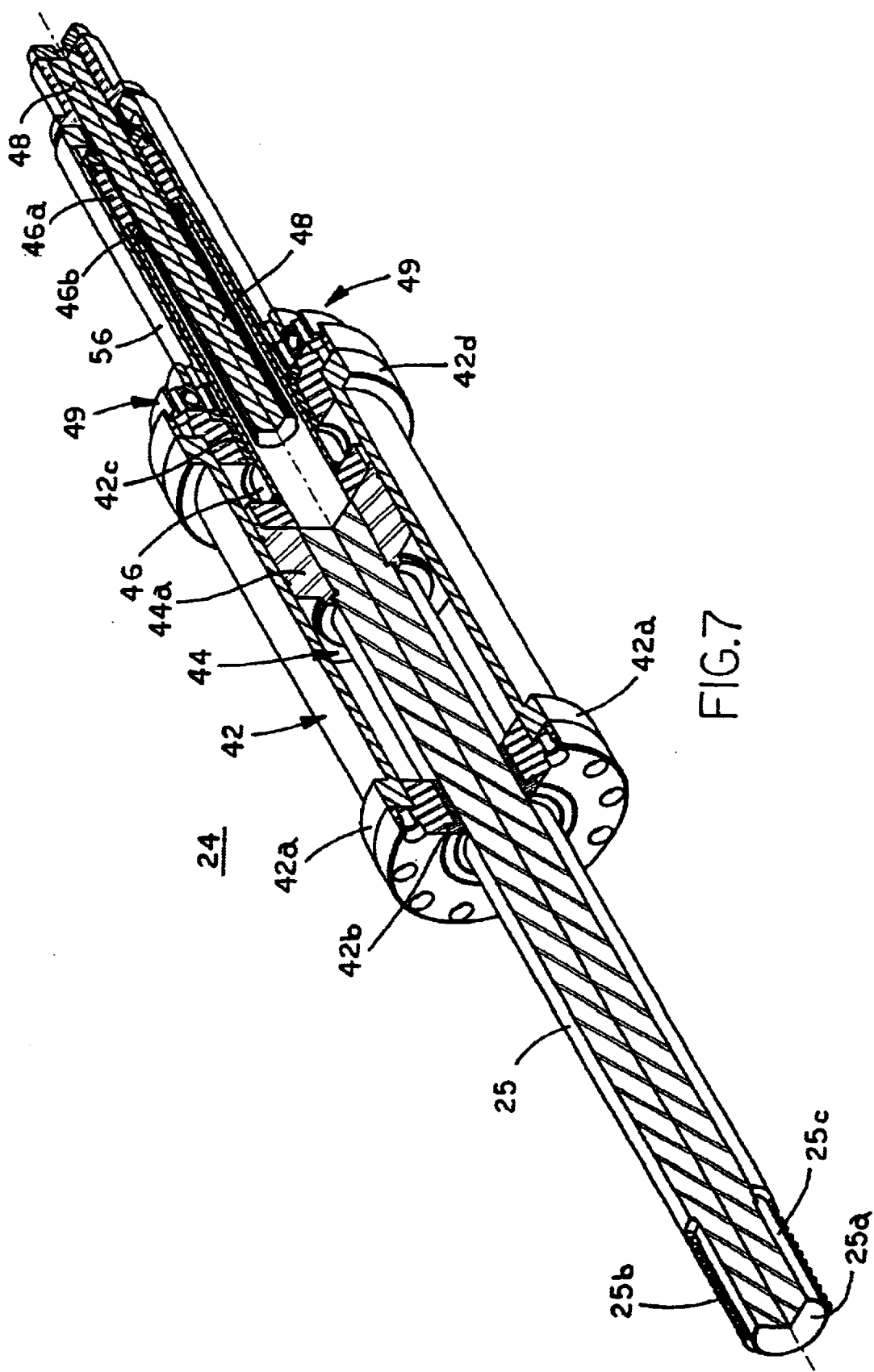
FIG. 7 is an enlarged view of the cut away tie rod assembly of FIG. 6.

As best shown in FIGS. 5–7, each tie rod assembly 24 includes an hydraulic cylinder 42 and a piston assembly 44, which is slidably positioned within cylinder 42. Piston assembly 44 includes a piston 44a, with the cylindrical tie rod 25 extending longitudinally from one end of piston 44a and outward from a forward end 42a of cylinder 42, and a generally hollow tube or shaft 46, which extends from an opposite end of piston 44a. Tie rods 25 extend through a seal or bushing 42b at forward end 42a, and further through a bushing 22a at movable platen 22, while shaft 46 extends through a seal or bushing 42c at a rearward end 42d of cylinder 42. Each tie rod 25 preferably includes a partially threaded end 25a at an end opposite piston 44a. Partially threaded end 25a includes partial threads 25b between unthreaded regions 25c, for engagement with the correspondingly formed passageways 28c of locking members 28 of fixed platen 18.

Piston assembly 44 is longitudinally movable along and within cylinder 42 via pressurized hydraulic fluid at either side of piston 44a, in order to adjust an amount of extension of tie rod 25 from forward end 42a of cylinder 42. Adjustment of the amount of extension of the tie rod provides for mold height adjustment of the tie rod so the tie rod may accommodate mold parts of varying heights or depths. The hydraulic fluid is under high pressure and is substantially incompressible such that movement of piston assembly 44 against the pressurized fluid is substantially precluded. The pressurized fluid may be provided at either end of hydraulic cylinder 42 via an hydraulic pump or the like (not shown). Piston assembly 44 is thus substantially locked in position, such that a desired amount or length of tie rod 25 is extended from cylinder 42, in order to properly engage the locking members when the mold parts 19 and 23 are seated together for molding an item therebetween. It is further envisioned that piston assembly 44 may be mechanically locked in position relative to cylinder 42 to further preclude relative movement of the piston assembly.

Hollow and shaft or rod 46 extends from an opposite end of piston 44a than tie rod 25 and includes a splined end portion 46a at its outer end from cylinder 42. As shown in FIG. 7, splined portion 46a defines a non-cylindrical opening or passageway 46b for engagement with a correspondingly formed non-cylindrical elongated member or key or shaft 48, such that rotation of shaft 48 causes corresponding rotation of shaft 46, piston 44a and tie rod 25, as discussed below. Preferably, shaft 48 is mounted at an outer end of a hollow sleeve or shaft cover 56, which substantially encases shaft 46 as shaft 46 extends from cylinder 42. Shaft cover 56 is rotatably mounted to rearward end 42d of the cylinder 42 and/or at the end of the cylindrical support portion 35b of frame 35 via a bearing assembly 49 (FIGS. 5 and 7). Shaft cover 56 may engage the splines along shaft 48 or may be bolted or otherwise secured to shaft 48, in order to rotatably drive shaft 48, as discussed below. Shaft cover 56 provides a mounting structure for key 48, such that shaft 48 remains engaged with corresponding opening 46b of hollow shaft 46 as piston 44a, and thus hollow shaft 46, may be moved along and within cylinder 42 via pressurized fluid at either side of piston 44a.

Cylinders 42 are mounted within cylindrical supports 35b of support frame 35 of tie rod carriage 34. Cylinders 42 are generally fixedly secured within the cylindrical supports 35b, such that cylinders 42, and thus tie rod assemblies 24 are movable relative to movable platen 22 and movable platen carriage 32 with the movement of tie rod carriage 34 and support frame 35. A rotational device 40 is preferably mounted at a rearward end 35a of each side of frame 35 of tie rod carriage 34, and is operable to rotate shaft covers 56, and thus shafts 48, to further cause rotation of piston assemblies 44 and thus tie rods 25, for locking tie rods 25 to locking members 28 of fixed platen 18, as discussed below. Preferably, as best seen in FIG. 4, rotational device 40 includes an hydraulic actuator 50, which includes a piston rod 50a which is extendable and retractable from an hydraulic cylinder 50b. Piston rod 50a is interconnected with a linkage or arm 52, which is further interconnected with a collar 54 clamped or otherwise locked about shaft cover 56. Preferably, a second linkage or arm 53 extends from collar 54 and inter-connects collar 54 with a second collar 55 at a shaft cover 56 of an upper tie rod assembly 25. Accordingly, as piston rod 50a is extended and retracted from cylinder 50b, linkages 52 and 53 cause collars 54 and 55 to rotate, which further causes rotation of shaft covers 56 and shafts 48, which further causes a corresponding rotation of piston assembly 44 to rotate tie rods 25 with respect to cylinders 42 and tie rod carriage 34.

Figure 8:
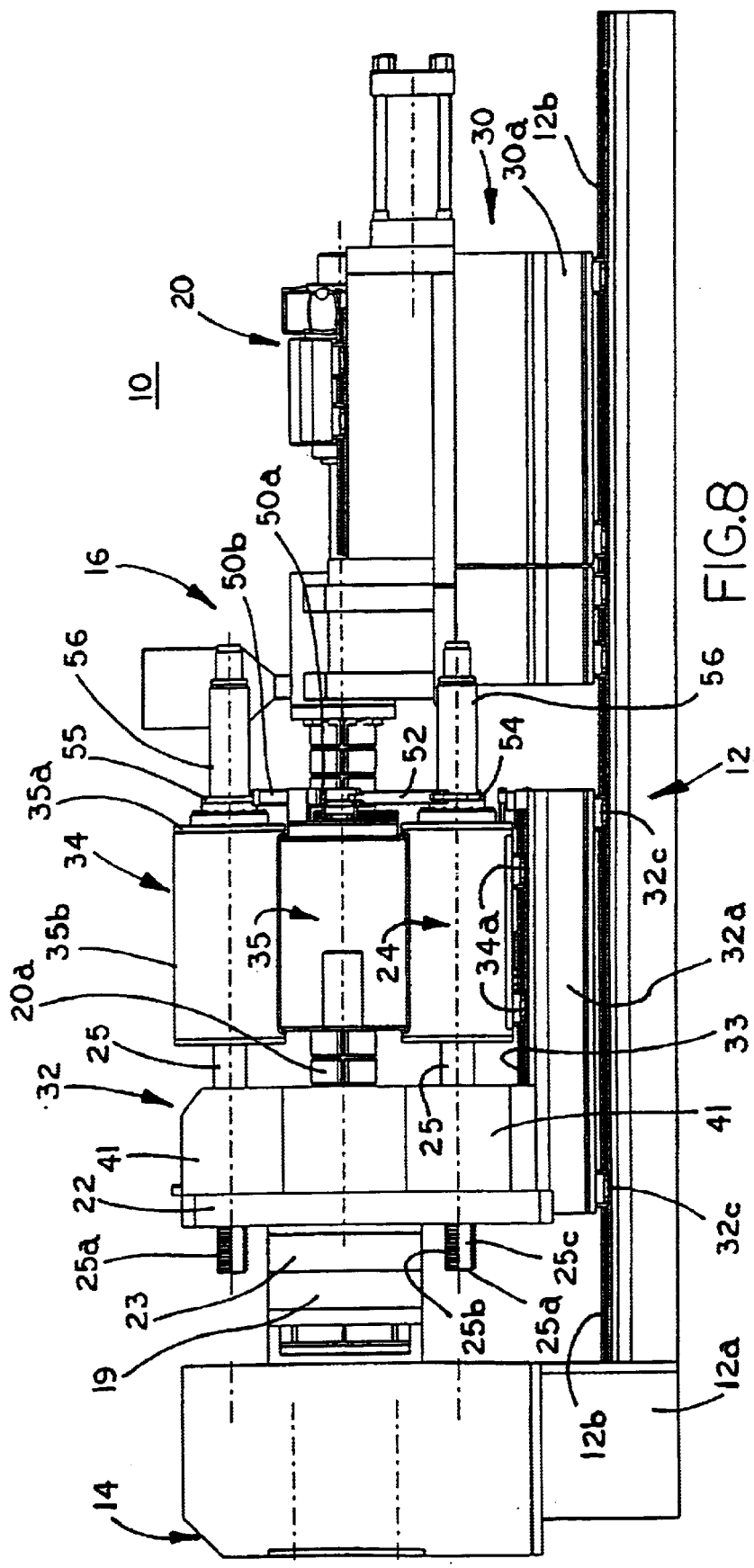
FIG. 8 is a side elevation of the molding apparatus, with the mold parts at the platens being engaged with one another.
Figure 9:
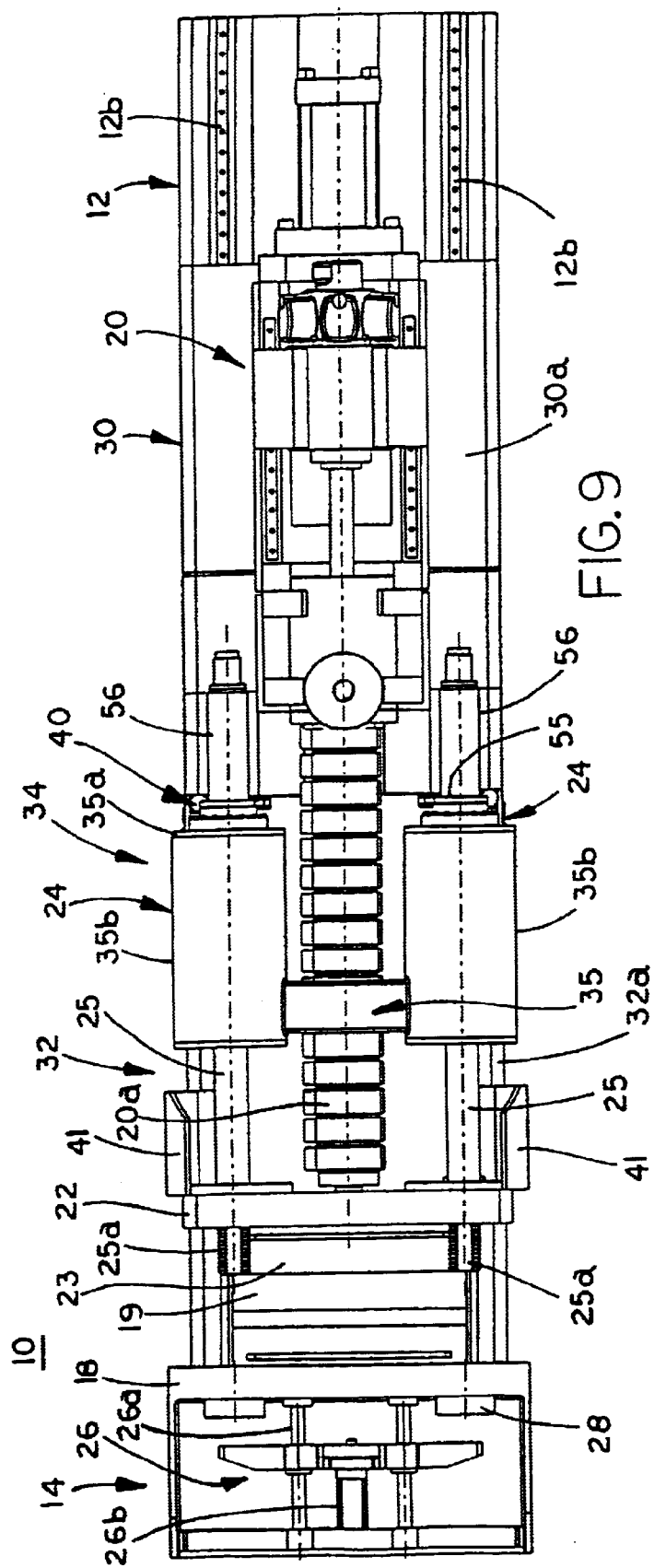
FIG. 9 is a top plan view of the mold apparatus of FIG. 8.
Figure 10:
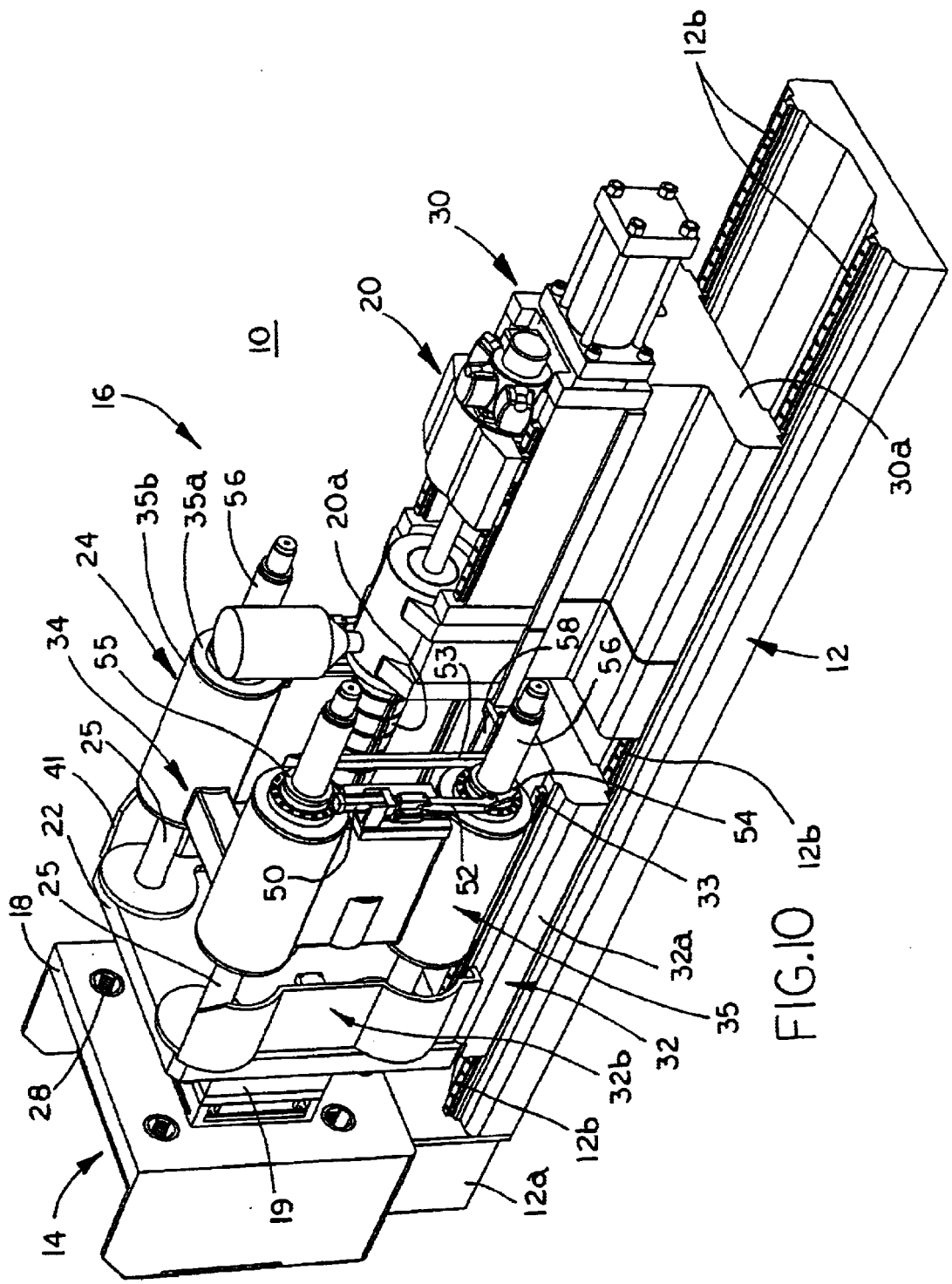
FIG. 10 is a perspective view the mold apparatus of FIGS. 8 and 9.

Referring now to FIGS. 8–10, movable carriage 16, which preferably includes both movable platen carriage 32 and injector carriage 30, is movable along rails 12b, via extension of actuator 31 (FIG. 3), toward fixed platen support 14 until the mold part 23 at movable platen 22 is engaged with and seated against mold part 19 of fixed platen 18, such that the mold parts are in position for the molding process to begin. Mold part 23 may further include a plurality of pins or projections 38 extending therefrom for engaging corresponding openings 39 in fixed mold part 19, in order to guide the mold part 23 into proper alignment with mold part 19 as movable platen 22 is moved toward fixed platen support 14. Preferably, tie rod carriage 34 is moved along rails 33 of movable platen carriage 32 via extension/retraction of actuator 58 (FIG. 3), while movable platen carriage 32 is simultaneously moved along base 12 toward fixed platen 18 via extension/retraction of actuator 31, such that the tie rods 25 extend into locking members 28 of fixed platen 18 for securement thereto substantially simultaneously with mold part 23 engaging and seating against mold part 19. Alternately, as shown in FIGS. 8–10, movable platen carriage 32 and injector carriage 30 may be movable independently of movement of tie rod carriage 34 with respect to movable platen carriage 32, such that tie rods 25 remain in their retracted position relative to movable platen 22, and are not yet extended to engage fixed platen 18 until after the mold parts are engaged, without affecting the scope of the present invention. Alternately, tie rod carriage 34 may first be moved to extend the tie rods from movable platen carriage 32 prior to moving movable platen carriage 32 toward engagement with fixed platen support 14, without affecting the scope of the present invention. Prior to movement of tie rod carriage 34 and movable platen carriage 32, an amount of extension of the tie rods 25 may be adjusted, via pressurized fluid in cylinders 42, to accommodate variation in mold part height or depth when different mold parts are implemented at the fixed and/or movable platens.

Figure 14:
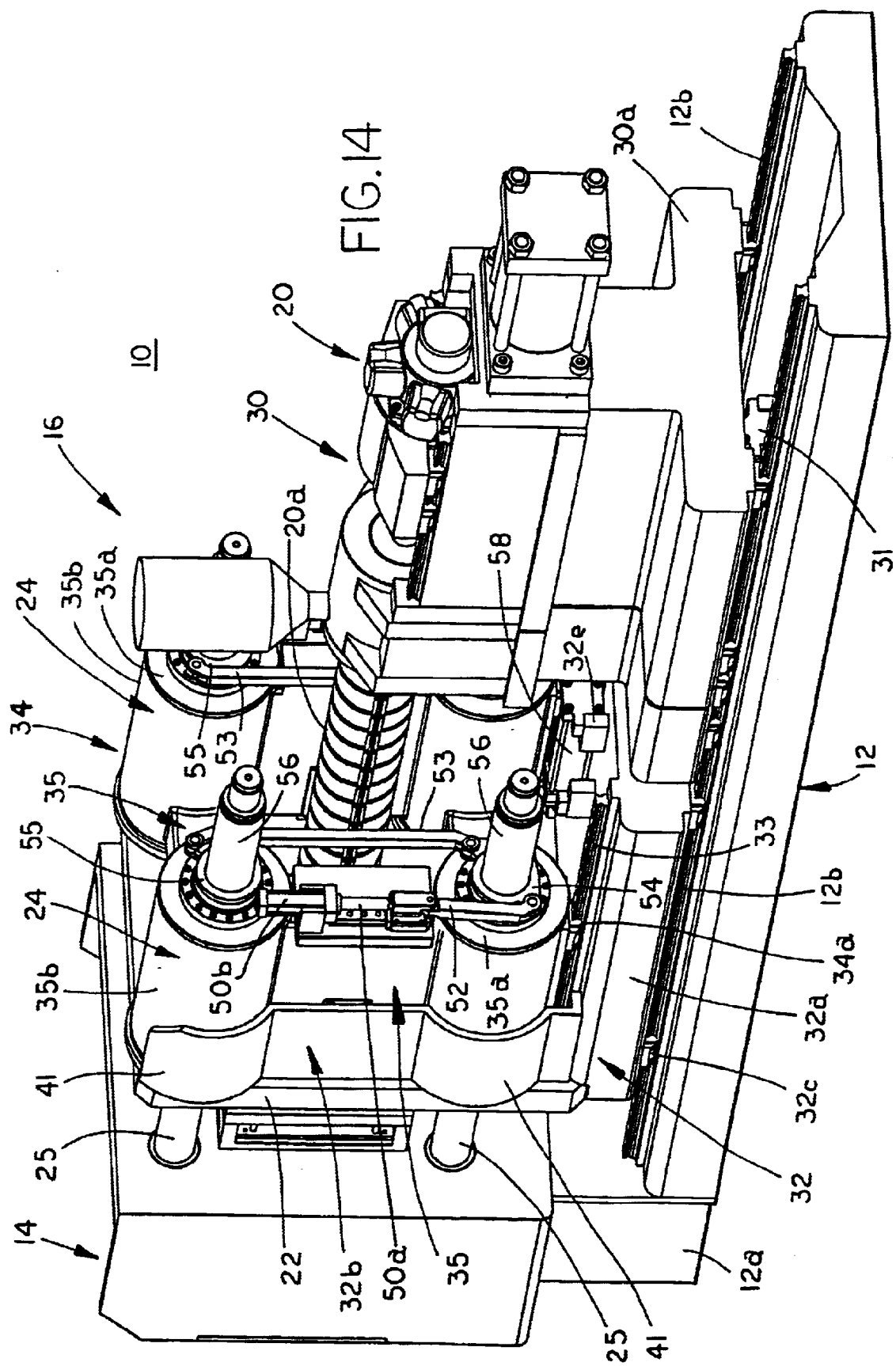
FIG. 14 is a perspective view of the mold apparatus of FIGS. 11–13.

Referring now to FIGS. 11–14, tie rod carriage 34 and movable platen carriage 32 are movable toward fixed platen 18 until tie rods 25 extend fully between movable platen 22 and fixed platen 18 for securement of tie rods 25 within locking members 28 of fixed platen 18. As the tie rods 25 are extended into and/or through locking members 28 of fixed platen 18, the threaded portions 25b of tie rod end 25a extend along the non-threaded portions 28b of passageway 28c of locking members 28, until tie rods 25 are fully advanced or extended from movable platen 22, and movable platen 22 is fully advanced along base 12 until mold part 23 fully engages and seats against mold part 19. After ends 25a of tie rods 25 are fully inserted into or through locking members 28, hydraulic cylinders 50 are actuated via pressurized hydraulic fluid to extend linkages 52 to cause rotation of collars 54, which subsequently causes movement of linkages 53 to further cause rotation of collars 55, thereby rotating both piston assemblies and tie rods at both sides of tie rod carriage 34, as shown in FIG. 14. As collars 54, 55, and thus tie rods 25, are rotated, the threaded portions 25b of tie rods 25 engage the threaded portions 28a of locking members 28, to substantially limit or preclude longitudinal movement of tie rods 25 with respect to locking member 28 and fixed platen 18, thereby substantially precluding longitudinal movement of movable platen 22 with respect to fixed platen 18. Cylinder 42 may then be actuated to move piston 44a toward rearward end 42d of cylinder 42, in order to pull the platens toward one another to provide a clamping force at the platens. The mold parts 19 and 23 are thus secured tightly together, such that the pressures exerted by the injected material cannot separate the mold parts during the molding process. Once the tie rods are secured in place via rotation of the tie rods by rotation device 40, injection machine 20 is actuated to move the injection screw or piston 20c within injection machine 20 and injector barrel 20a to push the hardenable liquid material into the cavity defined between mold parts 19 and 23, as is known in the molding art. The material then fills the cavity and is allowed to harden.

After the molding process is completed and the material has had time to harden within the mold parts, cylinder 42 is actuated in the opposite direction to decompress the platens. Hydraulic cylinder 50 then retracts to rotate the tie rods in the opposite direction until the threaded portions 25b of the tie rods 25 are again aligned with the unthreaded portions 28b of the locking members 28, such that the tie rods and the movable platen may be moved away from the fixed platen to separate the mold parts via movement of tie rod carriage 34 along movable platen support 32 and movement of movable platen support 32 along base 12. After the mold parts are separated, the molded item or product may be removed from mold part 19 via extension of the ejector rods 26a of ejector 26. The mold parts may then be cleaned and/or prepped for the next product to be molded and the process may be repeated. Separation of the mold parts and retraction of the tie rods facilitates easy and safe removal of the molded product from the mold parts.

Figure 15:
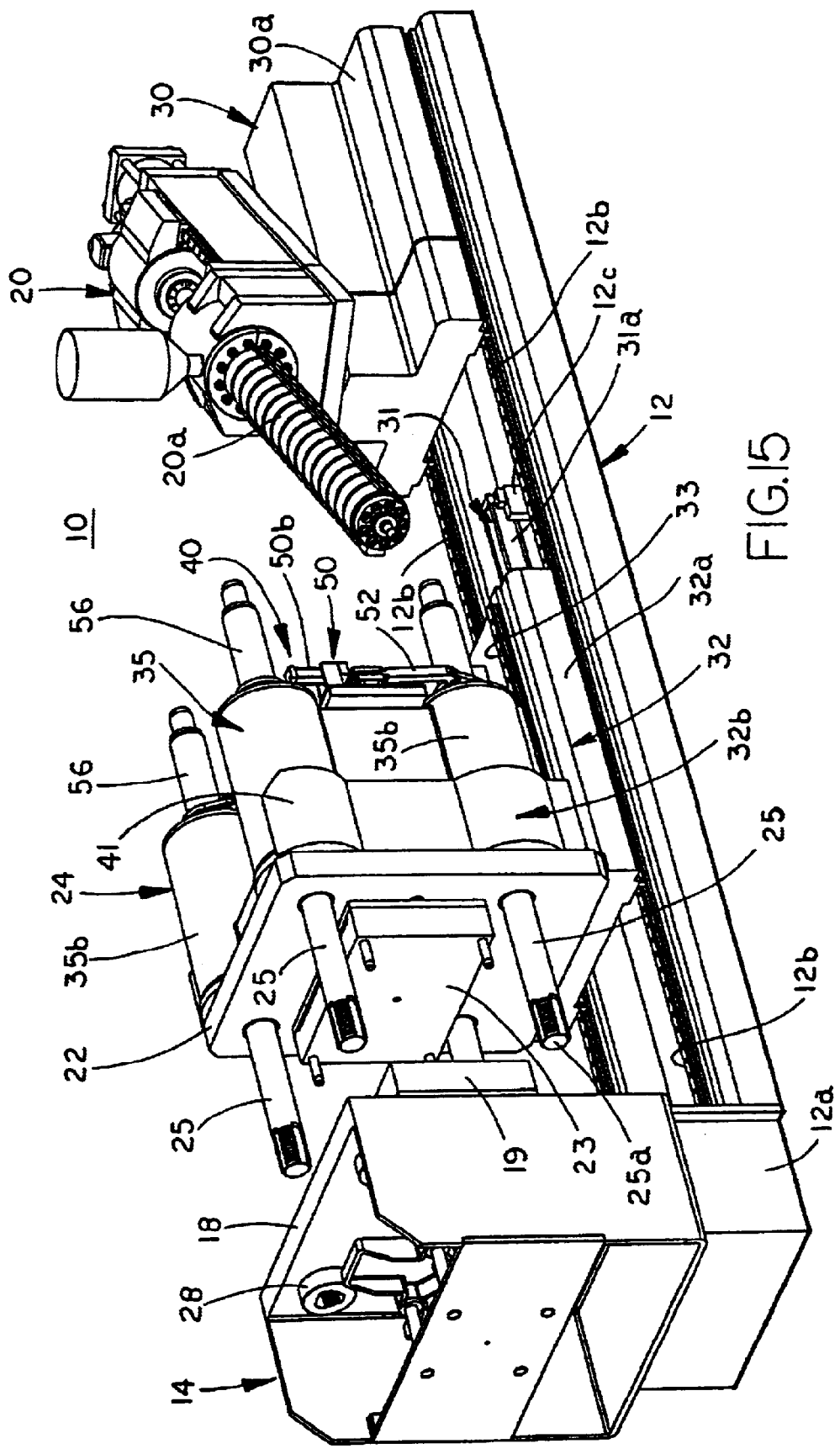
FIG. 15 is a perspective view of a mold apparatus of the present invention, with the movable injector module separated from the movable platen module, to allow the injector machine to pivot relative to the movable module.
Figure 16:
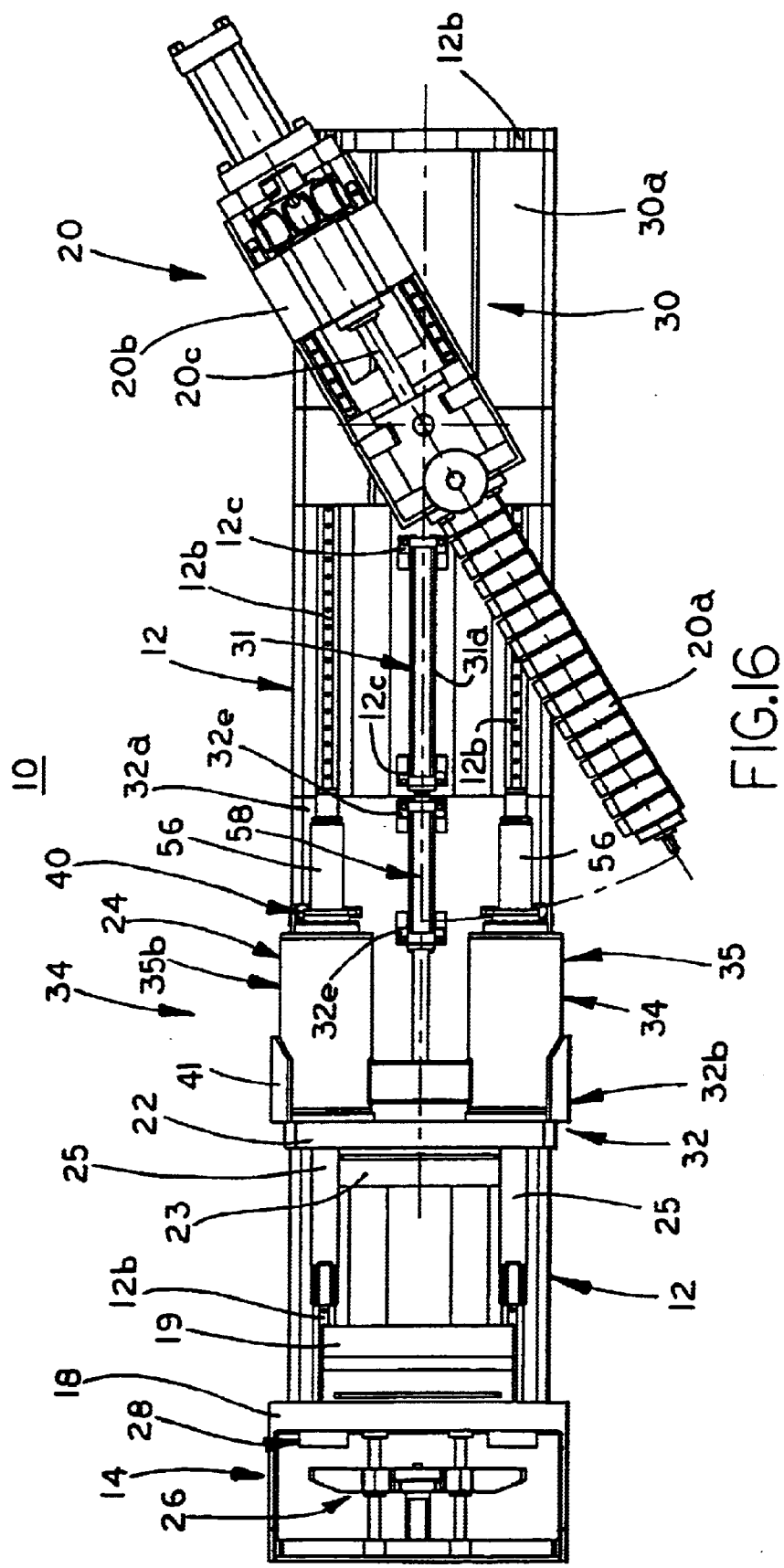
FIG. 16 is a top plan view of the mold assembly of FIG. 15.

As shown in FIGS. 15 and 16, in order to clean or service the injector 20, movable platen carriage 32 may be movable toward fixed platen 18, while injector carriage 30 is retracted or otherwise retained at an opposite end of support base 12, such that movable platen carriage 32 is separated from injector carriage 30. Tie rod carriage 34 may also be moved forwardly along movable platen carriage 32 to provide an additional gap or clearance between injector carriage 30 and movable platen carriage 32. Preferably, injection machine 20 is pivotally mounted to injector carriage 30, such that when the carriages 30 and 32 are separated, injection machine 20 may be pivoted about a generally vertical axis to allow for maintenance or service or cleaning of the injector end of injector barrel 20a of injection machine 20.

Figure 17:
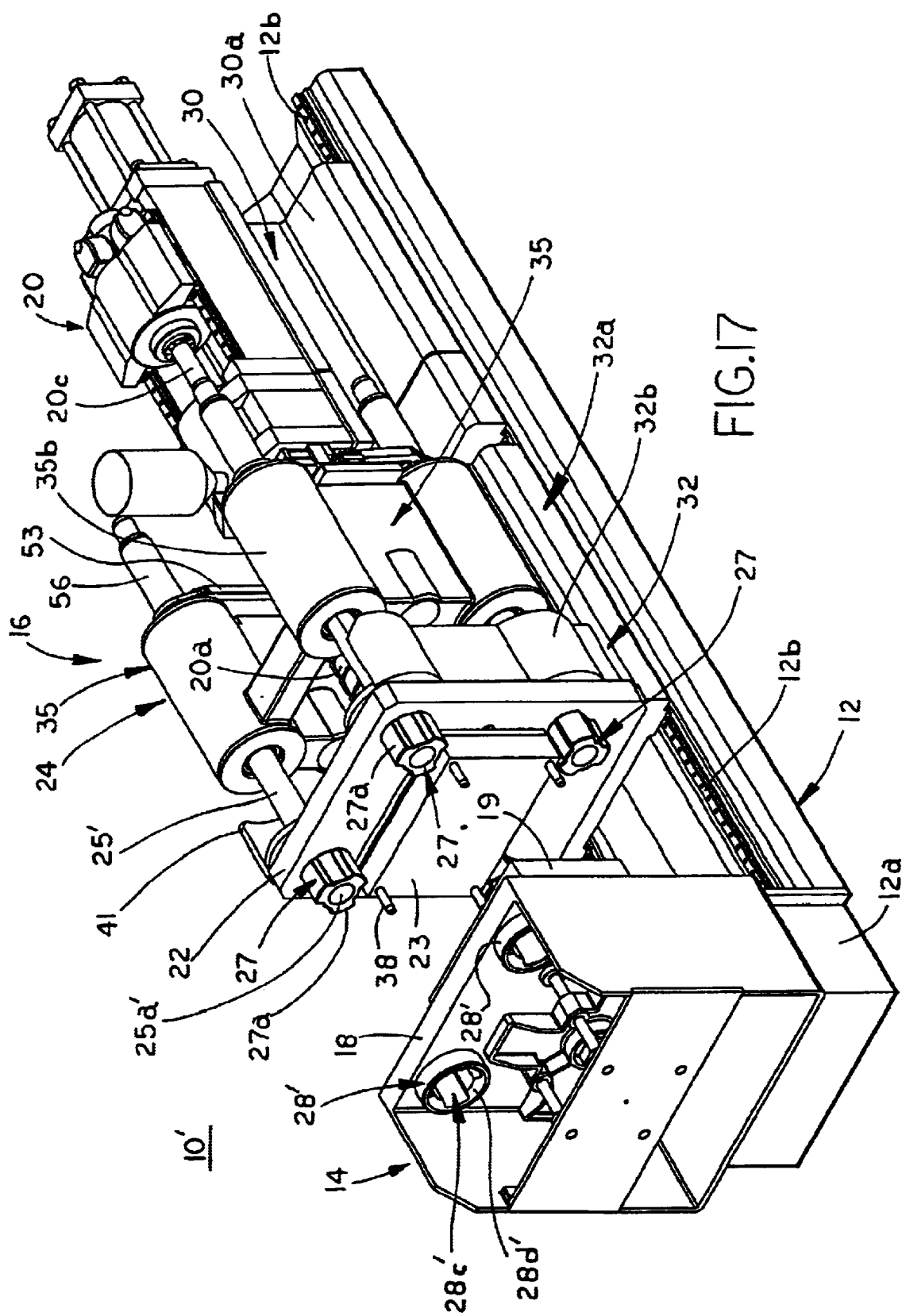
FIG. 17 is a perspective view of an alternate embodiment of the present invention, with a lock nut at the end of each tie rod.
Figure 18:
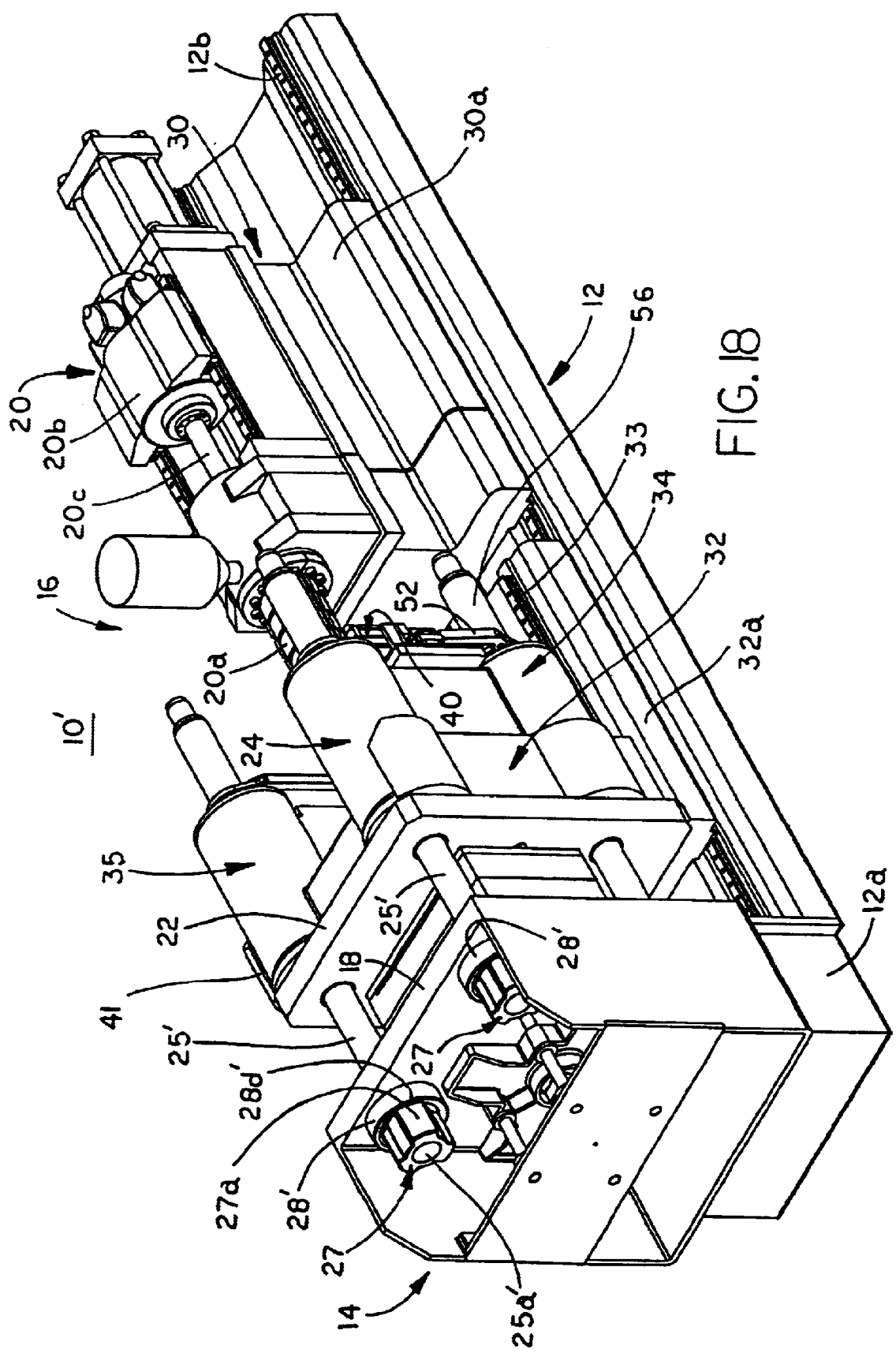
FIG. 18 is a perspective view similar to FIG. 17, with the tie rods extended and locked to the fixed platen.

Referring now to FIGS. 17 and 18, a mold assembly 10' may include tie rods 25', each of which includes a non-cylindrical shaped lock nut 27 secured at the end 25a' of the rod 25'. Preferably, lock nut 27 includes a plurality, for example, three, arms or extensions 27a which extend radially outwardly from tie rod 25'. Preferably, lock nut 27 is threaded onto tie rod 25' and pinned thereto via a locking pin or the like (not shown) extending therethrough, in order to prevent loosening of lock nut 27 on tie rod 25'. Corresponding locking members 28' may be provided at fixed platen 18. Each locking member 28' provides a non-cylindrical passageway 28c' therethrough which corresponds in shape to lock nut 27, and a generally flat surface 28d' at an opposite side of fixed platen 18 from mold part 19. Tie rods 25' are extendable and rotatable in the same manner of tie rods 25 discussed above, and extend such that lock nuts 27 insert entirely through the correspondingly shaped passageway 28c' through fixed platen 18 and each locking member 28. After the mold parts are fully seated and engaged and the tie rods are fully extended, rotation of tie rods 25' by rotation device 40 results in rotation of non-cylindrical lock nuts 27 until the tabs or flanges of the lock nuts are no longer aligned with the corresponding formed passageways 28c'. The tabs then engage the surfaces 28d', and thus prevent longitudinal movement of tie rods 25' relative to fixed platen 18, thereby securing the platens in the engaged position for the molding process. Similar to mold assembly 10, discussed above, the cylinder of the tie rod assembly may be actuated to pull the tie rods back toward movable platen 22, in order to compress or clamp the platens and mold parts tightly together. The other components of mold assembly 10' are substantially similar or identical to the components of mold assembly 10, discussed above, such that a detailed discussion of the structure and operation of mold assembly 10' will not be repeated herein.

Accordingly, mold apparatus or assembly 10 or 10' provides a movable molding module, which moves the injection machine, movable platen and tie rods generally together toward engagement with the fixed platen. The tie rods are extendable and retractable with respect to the movable platen, such that the tie rods may be retracted so as to be spaced from a gap between the mold parts when the movable platen is moved away from the fixed platen, thereby providing easier access to the mold parts when the mold parts are separated. The tie rods are extendable and rotatable to lock the tie rods to the fixed platen support, when the platens and mold parts are in the engaged position. Because the rotation device of the tie rods is positioned at the tie rod assembly or carriage, the present invention thus provides a mold module which has all of the movable parts and adjustments on the movable mold module, while the fixed platen support and fixed platen provide the fixed locking members and the fixed mold part. In this embodiment, the only movable or operable portion of the fixed platen support is the ejector device which is operable to eject the molded item from the mold part at the fixed platen after the item has hardened and the mold parts have been separated. Additionally, the present invention provides for easy adjustment of the tie rods to accommodate mold parts of differing depths or heights. The tie rods are movable within the cylinders to adjust for various mold heights and to clamp or release the tie rods with respect to the fixed platen. The tie rods may also be hydraulically and/or mechanically locked relative to the cylinders to prevent movement during the molding process.

Although shown and described as being a pair of hydraulic cylinders, clearly, actuators 31 and 58 may comprise other actuating means which are operable to impart a generally linear movement of one carriage relative to the other or others and/or to the base, such as a ball/screw type actuator or the like, without affecting the scope of the present invention. Also, other rotational means may also be substituted for the hydraulic cylinders and linkages of rotation device 40, without affecting the scope of the present invention.

Figure 19:
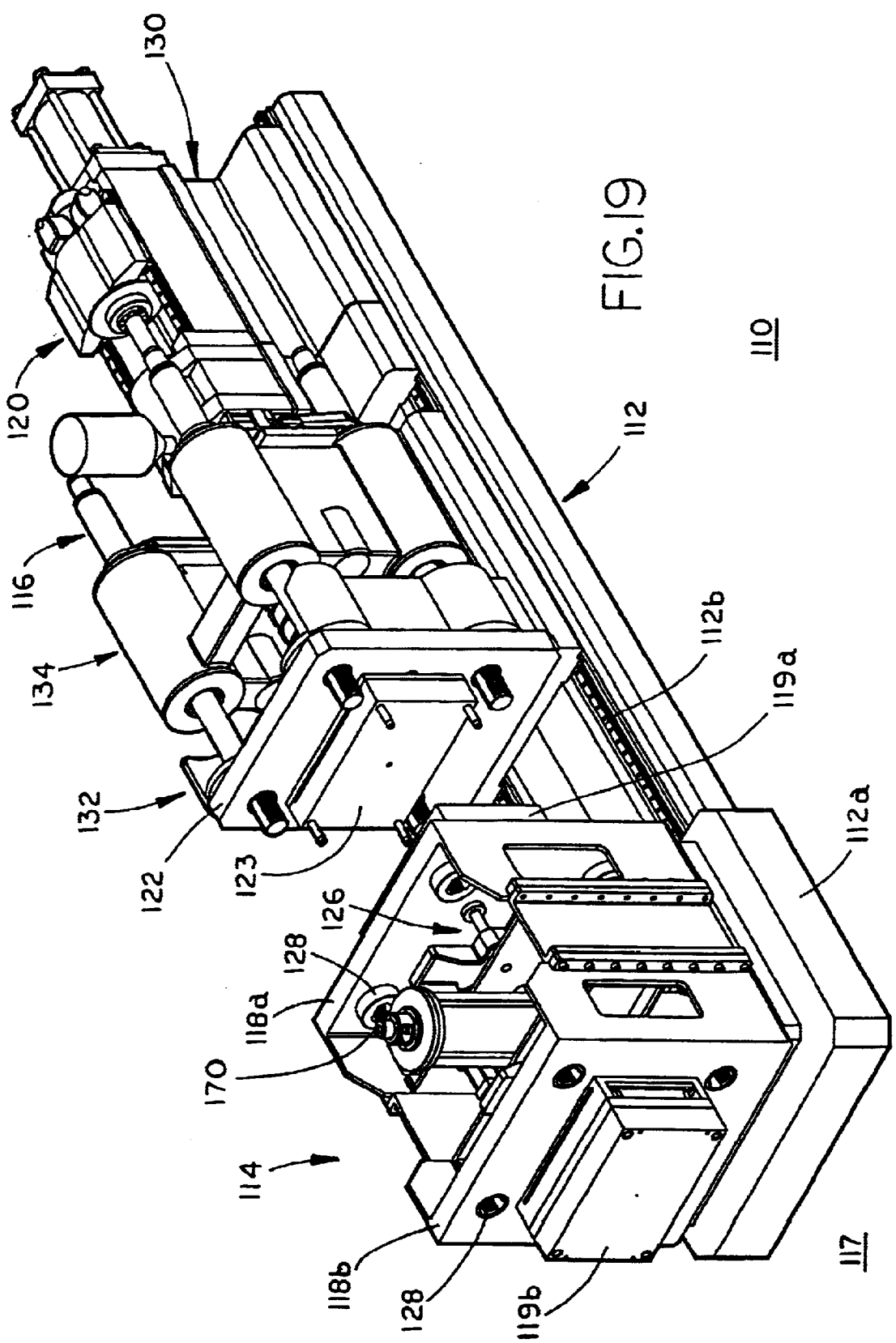
FIG. 19 is a perspective view of another embodiment of the present invention, with a pivotable fixed platen support at one end of a base structure.
Figure 20:
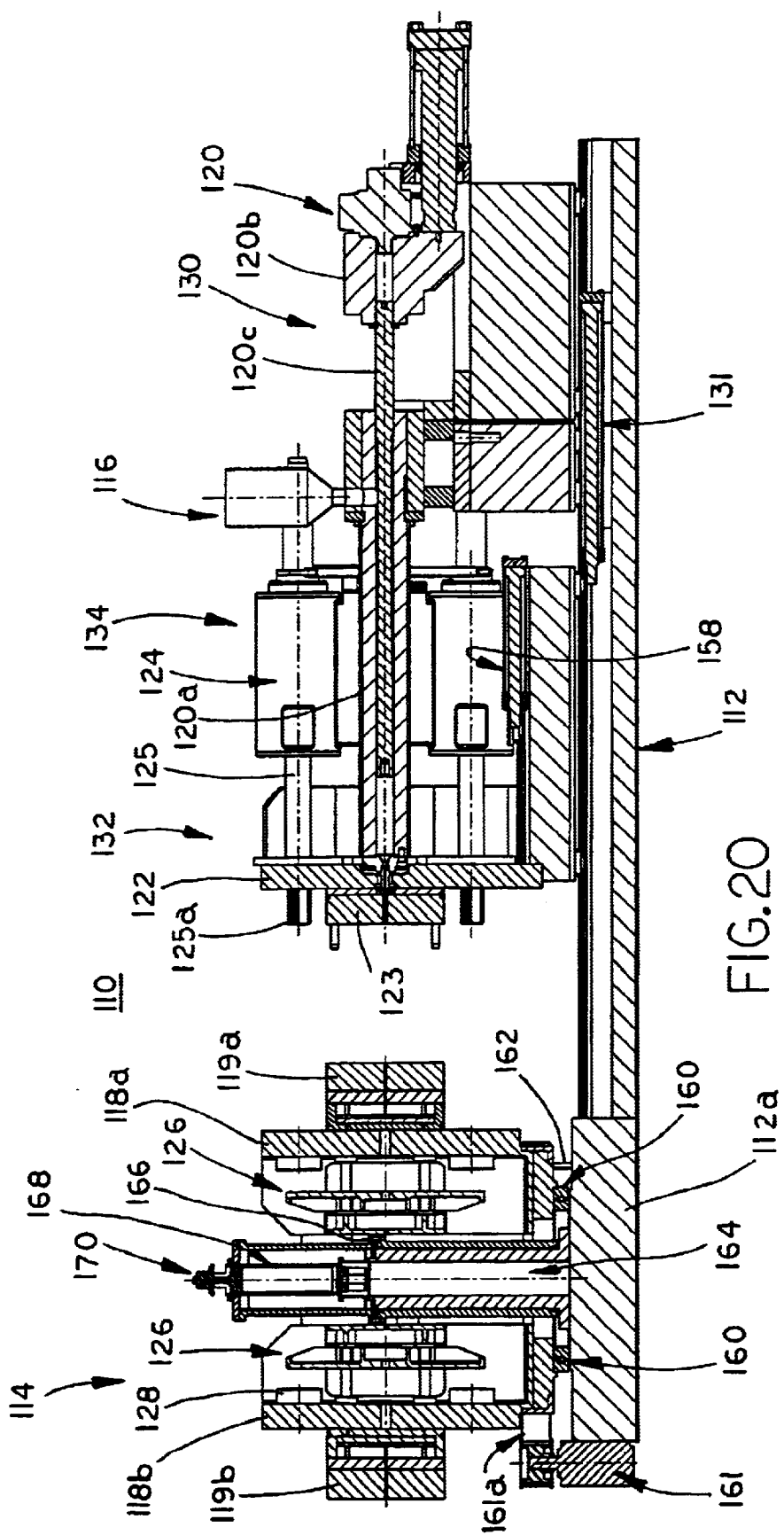
FIG. 20 is a side elevation and partial sectional view of the mold assembly of the FIG. 19.
Figure 21:
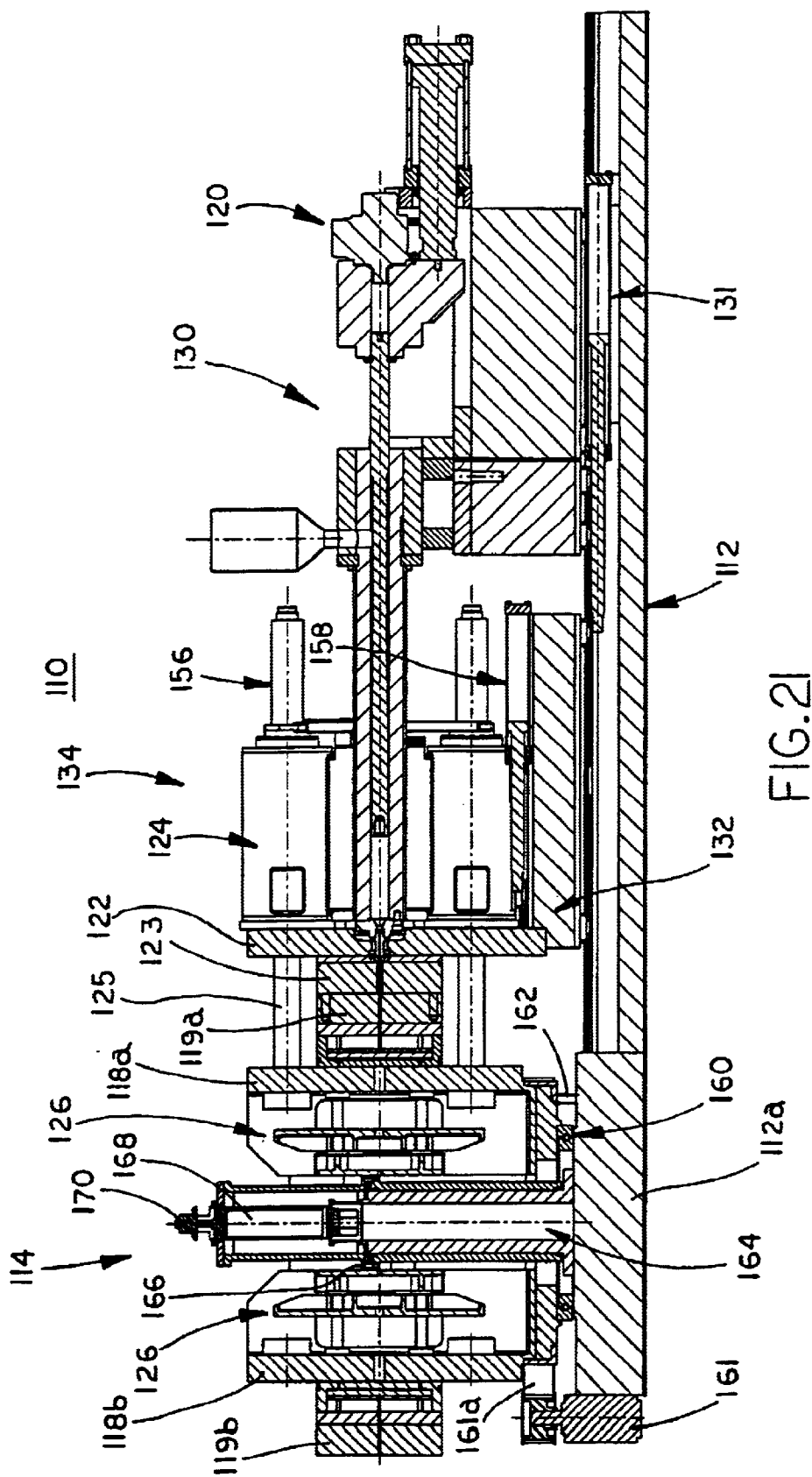
FIG. 21 is a side elevation and partial sectional view similar to FIG. 20, with the mold parts engaged and the tie rods extended.

Referring now to FIGS. 19–21, a mold assembly 110 includes a support base 112, a fixed platen support 114, and a movable carriage or mold module 116, which includes a movable platen 122, tie rod assemblies 124, and an injection machine 120. The movable mold module 116 is generally similar to the movable mold module 16 described above, such that a detailed discussion of the components will not be repeated herein. Similar elements are therefore labeled with similar reference numerals with the addition of prefix 100 in FIGS. 19–21. Fixed platen support 114 is pivotably or rotatably mounted to a pedestal 112a at an end of support base 112 and includes a pair of fixed platens 118a, 118b, which have corresponding mold parts 119a, 119b mounted at opposite ends of fixed platen support 114. Each of the fixed platens 118a, 118b further includes locking members 128 positioned through platens 118a, 118b and spaced around mold forms 119a and 119b. Fixed platen support 114 is rotatable about a generally vertical axis 113, such that one mold part 119a may be aligned with movable platen 122 and a corresponding mold part 123, while the other mold part 119b is not aligned or is booked toward an insert or access station 117 for easy access to the mold part and/or a completed molded product or item. As used herein, "fixed platen support" means a platen support that does not substantially advance or retract the mounted platen during the mold closing and opening steps and is therefore "fixed", although the "fixed platen support" may be movable during other operational steps, such as by rotating the fixed platen support to cycle the mounted platen or platens between molding and/or access stations.

Fixed platen support 114 is rotatably mounted at pedestal 112a via a generally circular or ring shaped bearing assembly 160 (FIGS. 20 and 21). A motor 161 and associated gears or sprockets 161 a may be provided to impart a rotational movement of support 114 relative to pedestal 112a in response to actuation of motor 161 in either direction. One or more lock pins 162 may be provided to insert and connect between a base 14a of fixed platen support 114 and pedestal 112c, in order to lock or prevent rotation of support 114 when support 114 is in an appropriate orientation with respect to movable module 116. Once pivotable support 114 is locked in position with one of the mold parts 119a, 119b aligned with movable mold module 116, the movable mold module and tie rods are moved toward and into engagement with the aligned mold part 119a or 119b and the respective fixed platen 118a or 118b and locking members 128. Because tie rods 125 are positioned generally around the mold parts and lock movable platen 122 relative to fixed platen 118a or 118b during the molding processes, there are minimal forces acting at bearings 160 of support 114, since a majority of the forces are absorbed and controlled by tie rods 125 and locking mechanisms 128. Accordingly, bearings 160 may preferably be conventional roller bearings or the like, since they do not have to sustain excessive twisting or bending forces during the molding process.

Similar to fixed support 14, discussed above, each side of support 114 includes an ejector device or mechanism 126, which is provided at each fixed platen 118a, 118b and is operable to eject a molded product from the respective mold part 119a, 119b, in a similar manner as discussed above with respect to ejector device 26. Fixed platen support 114 preferably further includes a fluid manifold 164 which provides a passageway for coolant lines and hydraulic fluid lines (not shown) into fixed platen support 114 for communication of hydraulic fluid to the ejectors 126 and coolant for cooling the molds and surrounding components after the molding process is completed. Fluid manifold 164 is preferably a generally cylindrical column extending through a center of fixed platen support 114 and communicates the fluid to the components of support 114, while allowing 360 degrees of rotation of support 114 with respect to pedestal 112a of base 112. Preferably, fixed platen support 114 further includes a second circular ring or bearing 166 around the cylindrical manifold 164 which guides and supports fixed platen support 114 as fixed platen support 114 rotates about fluid manifold 164 and pedestal 112a. Preferably, fixed platen support 114 further includes an electrical control 168 and encoder 170, which together are operable to monitor or detect and adjust the location or orientation of rotatable support 114 with respect to base 112 and/or the movable mold module 116.

Rotatable support 114 may be indexed or rotated to an appropriate orientation for molding a product between the mold parts and then locked in position during the molding process. As the movable mold module 116 is moved to engage mold part 123 with mold part 119a or 119b, the tie rod assemblies 124 are extended and then rotated to engage the locking members 128 of the appropriate fixed platen, in a similar manner as discussed above with respect to molding apparatus 10. After a product has been molded and hardened between mold part 123 and one of the mold parts, such as 119a, and the movable mold module and tie rods have been retracted from fixed platen support 114, the rotatable support 114 may be indexed or rotated to move or book the mold part 119a and the associated product away from the movable platen and movable mold module 116, for easy access to the mold part in order to easily remove the molded product from the mold part. While the molded product is being removed from the mold part, the rotatable support may be locked in a position with the other mold part 119b in alignment with the movable module, such that a second product may be molded at the other mold part 119b via engagement of movable mold part 123 with the other fixed mold part 119b, and subsequent injection of the liquid material via injection machine 120. Accordingly, molding apparatus 110 provides an improved and more efficient molding process, whereby there is minimal or no down time between molding products, since a new product may be molded while a first molded product is simultaneously being removed from the mold parts, as shown in FIG. 21. Molding apparatus 110 also provides a safer molding apparatus via booking of the fixed platens and mold parts, since an operator does not have to reach or step between the mold parts to remove the molded product and to prepare the mold part for the next molding process.

Referring now to FIGS. 22–27, alternate embodiments of the present invention are shown with two or more movable mold modules which are movable along respective portions of a base structure and movable toward and away from a rotatable fixed platen support, which may include two or more fixed platens and corresponding mold parts. The movable mold modules of the embodiments shown in FIGS. 22–27 are substantially similar to movable mold module 10, discussed above, such that a detailed description of these modules will not be repeated herein. Additionally, the rotatable fixed platen supports shown in FIGS. 22–27 are substantially similar to rotatable support 114, discussed above, such that a detailed discussion of these supports also will not be repeated herein. Similar elements of the mold apparatuses have therefore been labeled with similar reference numerals to mold module 16 and 116 and rotatable fixed platen support 114, with an appropriate prefix (for example, 200 or 300) added to the numbers.

Figure 22:
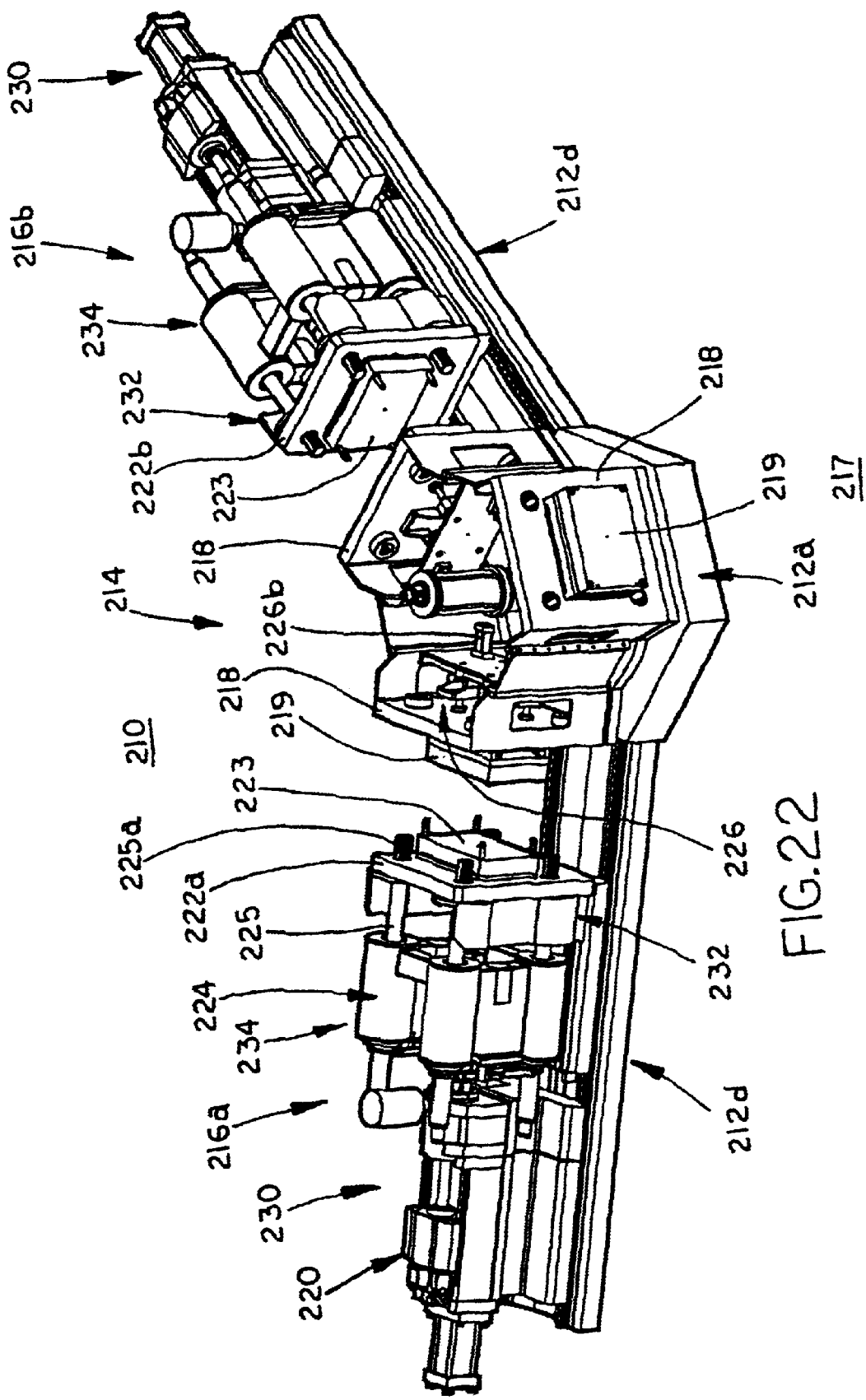
FIG. 22 is another embodiment of the present invention, with a pair of movable mold modules which are movable toward and away from a pivotable fixed platen support which includes three fixed platens thereon.

As shown in FIG. 22, a mold apparatus 210 includes a base structure 212, which includes a pair of portions or wings 212d extending from a central pedestal 212a. A rotatable fixed platen support structure 214 includes three fixed platens 218 and corresponding mold parts 219. Fixed platen support 214 is rotatably positioned at pedestal 212a and is rotatable about a generally vertical axis, while movable mold modules 216a, 216b are movable along respective portions or wings 212d of the support structure 212, as discussed above with respect to fixed platen support 114 and movable mold modules 16, 116. Movable mold modules 216a, 216b are operable to engage a mold part 223 at a movable platen 222a, 222b with a respective mold part 219 and corresponding fixed platen 218, to mold a product within a cavity defined between the corresponding mold parts 223 and 219. Both mold modules 216a and 216b may be simultaneously operable to mold products or portions of a product or item between the respective mold parts, while the third mold part of fixed platen support 214 is booked away from or not aligned with either of the movable mold modules 216a and 216b, such that a completed product may be removed from the mold part at an access station 217. Therefore, multiple parts may be molded at the same time, with no lengthy down time between molding processes for removal of the completed mold products from the respective mold parts.

Mold apparatus 210 is preferably operable as a two color, two layer or two material mold machine, whereby a first portion or color of a two colored or layered product is molded at one of the mold modules, such as mold module 216a. After the first portion of the product is completed, and mold module 216a has been retracted from the first mold part of support 114, rotatable support 214 is indexed or rotated to align the first mold part, and the partially molded product, with the second mold module 216b. Mold module 216b then engages the first mold part and molds the second color or portion of the product. After the product has been completely molded, mold module 216b is retracted from fixed platen support 214, whereby fixed platen support 214 may be rotated or indexed further or booked to insert or access station 217, to allow easy access to the completed two part or two colored product for easier and safer removal of the product from the first mold part of support 214. Additionally, while the second portion of the product is being molded by mold module 216b, a first portion of a second product may be generally simultaneously molded by the first mold module 216a at a second mold part of support 214, to further enhance the efficiency of the system. Likewise, as the completed product is being removed from the non-aligned or booked mold part, the second portion of the second product may be simultaneously molded by mold module 216b, while a first portion of a third product is also simultaneously molded by mold module 216a. Accordingly, the present invention provides substantial improvement in the efficiency of the mold processes, since portions of the molded product are molded while completed products are simultaneously removed from the mold parts. Also, because the mold parts only mold a portion of one product, larger products may be molded by mold apparatus 210, without requiring an increase in the overall size of the mold parts, since the mold parts do not have to accommodate multiple mold cavities thereon. Alternately, each mold module 216a, 216b and an aligned mold part of the support 214 may function to mold an entire product, whereby the rotatable support 214 may be indexed to sequentially position a finished product at the booked position for easy access thereto, without affecting the scope of the present invention.

Figure 23:
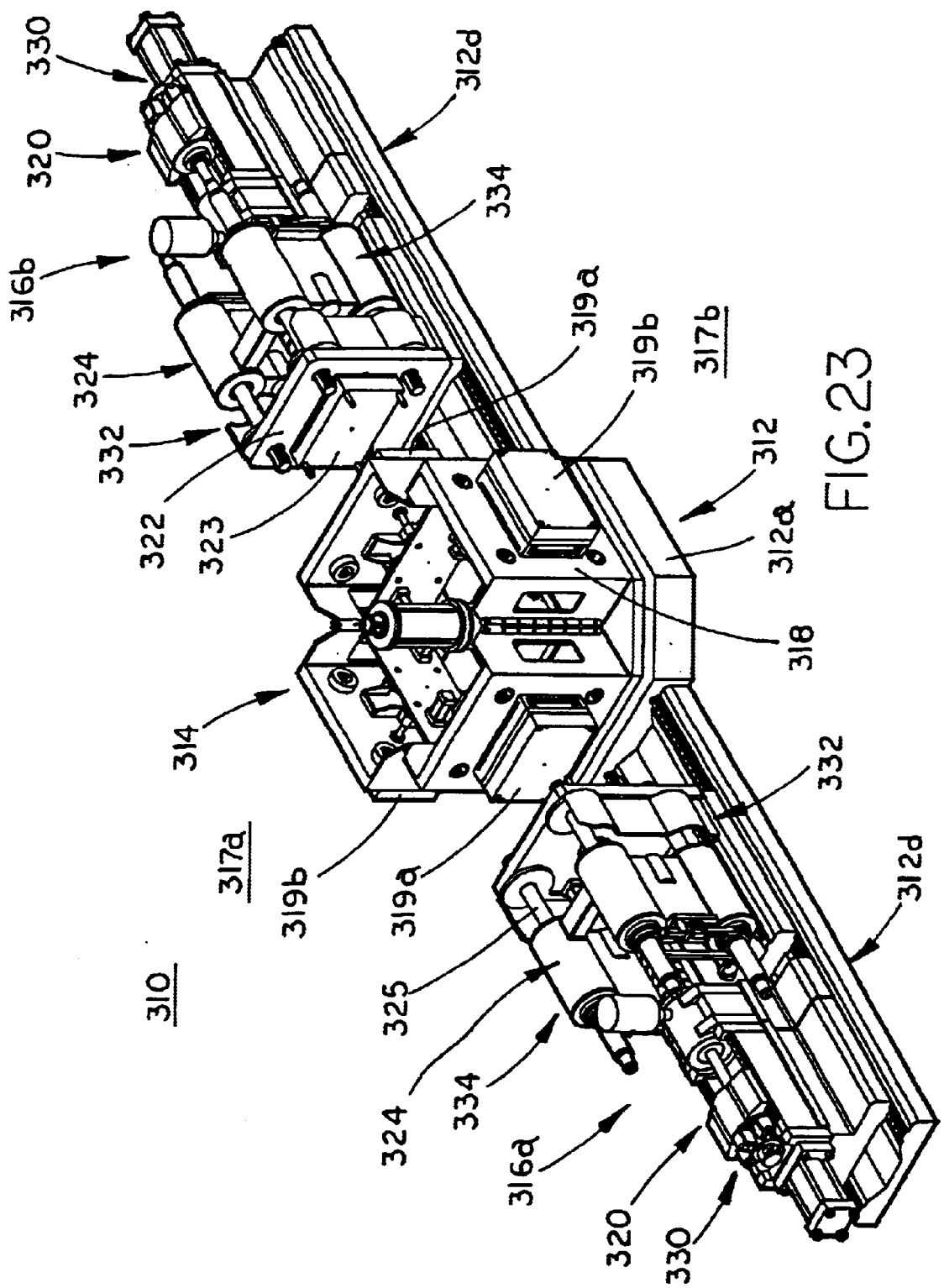
FIG. 23 is another alternate embodiment of the present invention, with a pair of movable mold modules which are movable with respect to a pivotable fixed platen support which includes four fixed platens thereon.

As shown in FIG. 23, a mold apparatus 310 also includes a pair mold modules 316a, 316b, and a rotatable fixed platen support 314, which includes four fixed platens 318 and corresponding mold parts 319a, 319b. Mold apparatus 310 may be implemented as a two color injection molding machine with two access or insert stations 317a, 317b, or may be implemented to mold two separate products simultaneously, whereby the rotatable support 314 is rotated 90 degrees or booked after the molding processes are complete to allow for easy removal of the completed products, while a second set of products are simultaneously molded via movable mold modules 316a and 316b engaging the other mold parts of the rotatable support 314.

Rotatable support 314 may be pivoted or rotated 90 degrees in one direction after each molding process or may be sequentially pivoted or rotated 90 degrees in opposite directions to book one or more of the mold parts while simultaneously aligning one or more of the other mold parts with a corresponding mold module for molding an item therebetween. For example, a first product may be molded with opposite mold parts, such as mold parts 319a, of the rotatable support. When the molding process is complete, the rotatable support may be rotated so that the mold parts 319a and the corresponding finished products are unloaded at opposite sides or stations 317a, 317b of the rotatable support, while new products are being molded with the other mold parts 319b. Because the mold parts may be different for the different products being molded, when the second products are completed, the rotatable support may be indexed or rotated in the opposite direction to return the first mold parts 319a to the corresponding mold modules for molding additional products, while the second completed products are then unloaded at opposite sides or stations 317b, 317a of the rotatable support than the corresponding products molded during the previous mold process. The rotatable support 314 may continue to oscillate back and forth to align the appropriate mold parts with the appropriate mold module and to book the products at either of the access stations. Clearly, if both mold modules were molding the same product, the rotatable support could continue to rotate in 90 degree increments in the same direction to mold and book products, without affecting the scope of the present invention.

Figure 24:
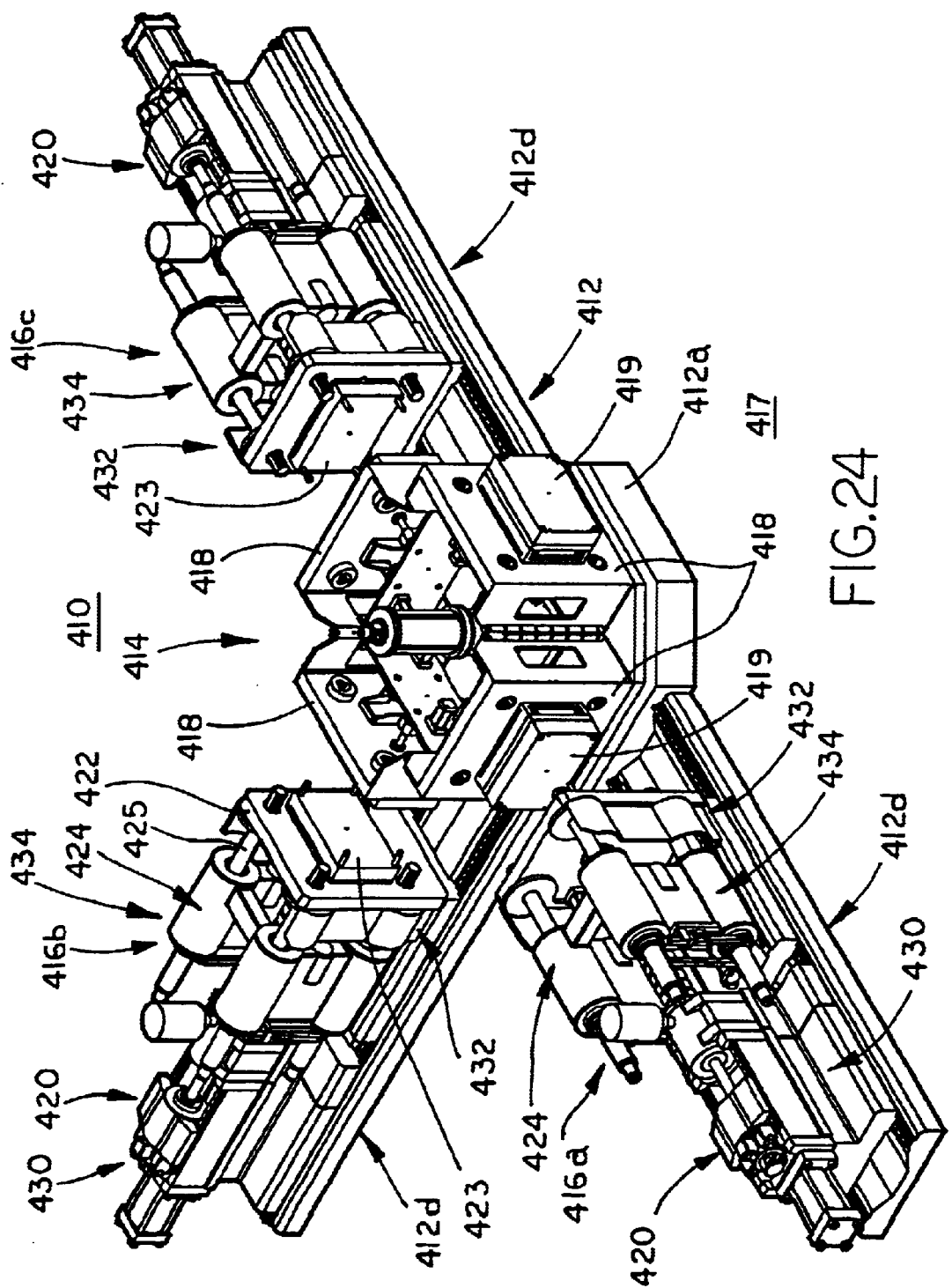
FIG. 24 is an alternate embodiment similar to FIG. 23, with a third movable mold module aligned with one the fixed platens of the pivotable fixed platen support.

As shown in FIG. 24, a mold apparatus 410 may include three mold modules 416a, 416b, 416c, which are movable along respective portions 412d of a base structure 412. Mold apparatus 410 includes a rotatable fixed platen support 414, which includes four fixed platens 418 and corresponding mold parts 419. Mold apparatus 410 may thus be implemented to mold three individual products simultaneously, or mold a color or portion of a three colored or three layered product at each of the three mold modules 416a, 416b and 416c, while providing a removal or access/insert station 417 for removing the completed product from the mold part which is booked or not aligned with any of the mold modules. As discussed above with respect to mold apparatus 310, rotatable support 414 is indexed to move the mold part and portion of the product from one station to the next until the product has been completely molded. The rotatable support 414 is then further rotated or indexed to move or book the completed product to the access or removal station 417 for removal of the product from the mold part, while additional products or portions of other products are simultaneously molded between the mold parts 423 of mold modules 416a, 416b, 416c and the correspondingly aligned mold parts 419 of support 414.

Figure 25:
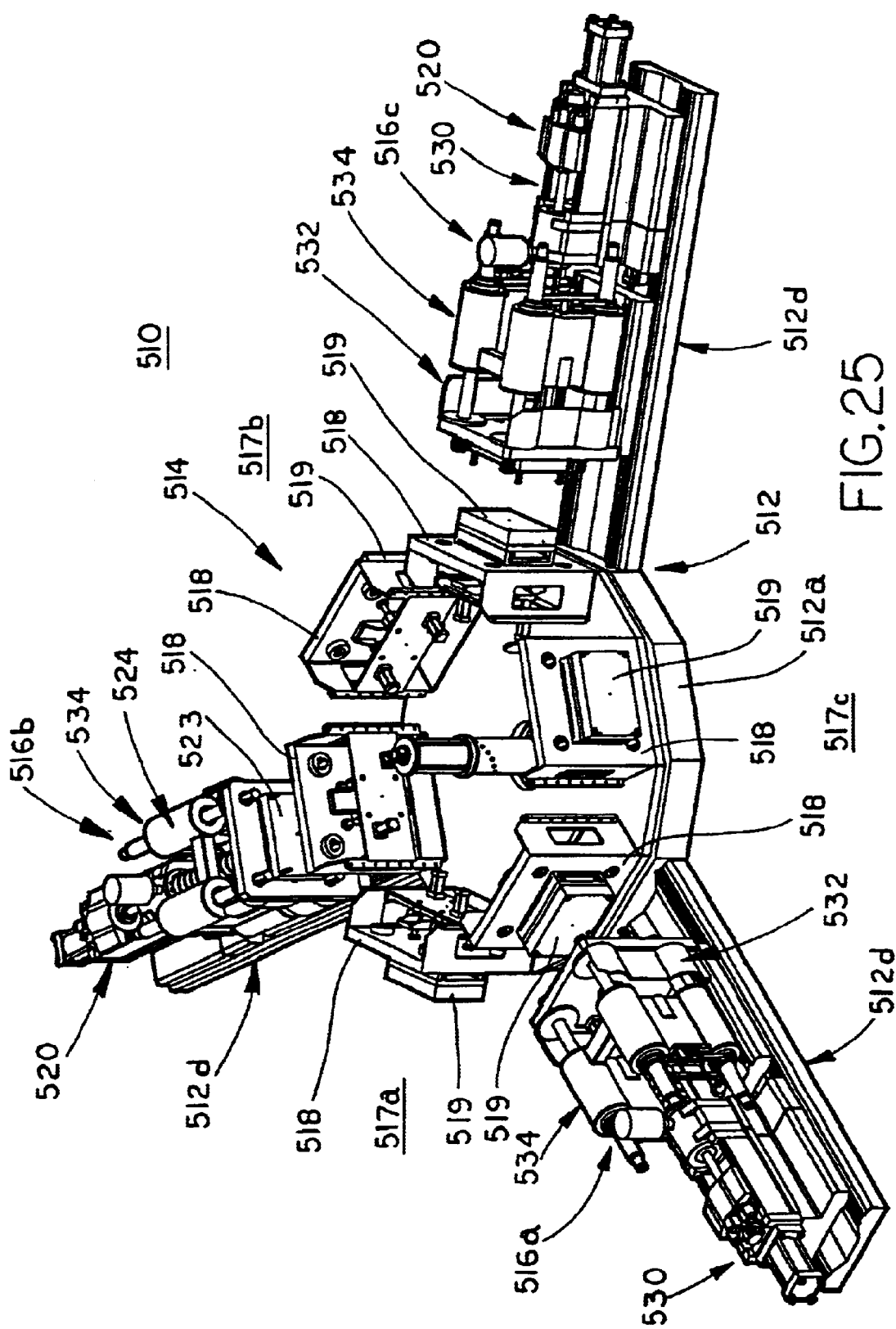
FIG. 25 is another embodiment of the present invention, with three movable mold modules which are movable with respect to a pivotable fixed platen support which includes six fixed platens thereon.

Similarly, as shown in FIG. 25, a mold apparatus 510 includes a rotatable fixed platen support 514, which includes six fixed platens 518 and correspondingly mold parts 519 and is rotatable or indexable to move the mold parts and respective portions of a product being molded therein to each of three mold modules 516a, 516b, 516c. The support 514 may be indexed about the three mold modules until a three colored or three layered product has been completely molded at the final molding station. The completed product may then be booked for easy access thereto via further rotation of support 514 to a point where the mold part which is holding the completed product is aligned with an insert or access station 517a, 517b or 517c, and thus not aligned with any of the mold modules 516a, 516b, 516c. Alternately, three separate products may be molded at each of the three mold modules 516a, 516b, 516c, whereby the rotatable support 514 is then rotated approximately 60 degrees to move or book the mold part 519 and associated completed product from a respective mold module to the appropriate access and removal station 517a, 517b, 517c. While the product is being removed at the station 517a, 517b, 517c, a subsequent product may be simultaneously molded between the now aligned mold part 519 and a respective mold module. Rotation of the rotatable support 514 may be in either direction, depending on which mold part is to be aligned with which movable module. As discussed above with respect to mold apparatus 310, rotatable support 514 may be rotated or oscillated in opposite directions to mold different products and to book the products at access stations at either side of the respective mold module.

Figure 26:
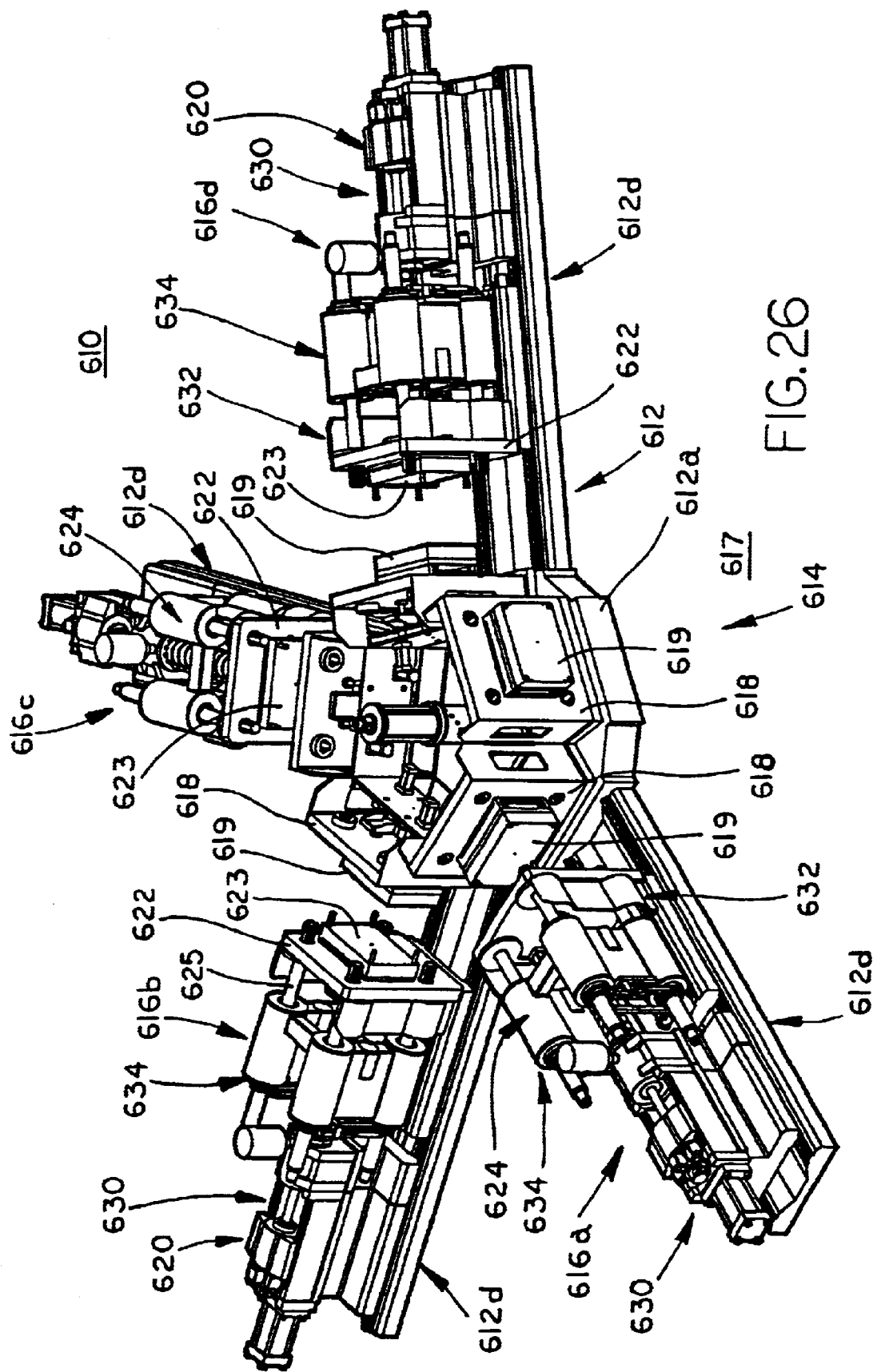
FIGS. 26 and 27 are other alternate embodiments of the present invention, with four movable mold modules movable with respect to a pivotable fixed platen support having multiple platens positioned therearound.
Figure 27:
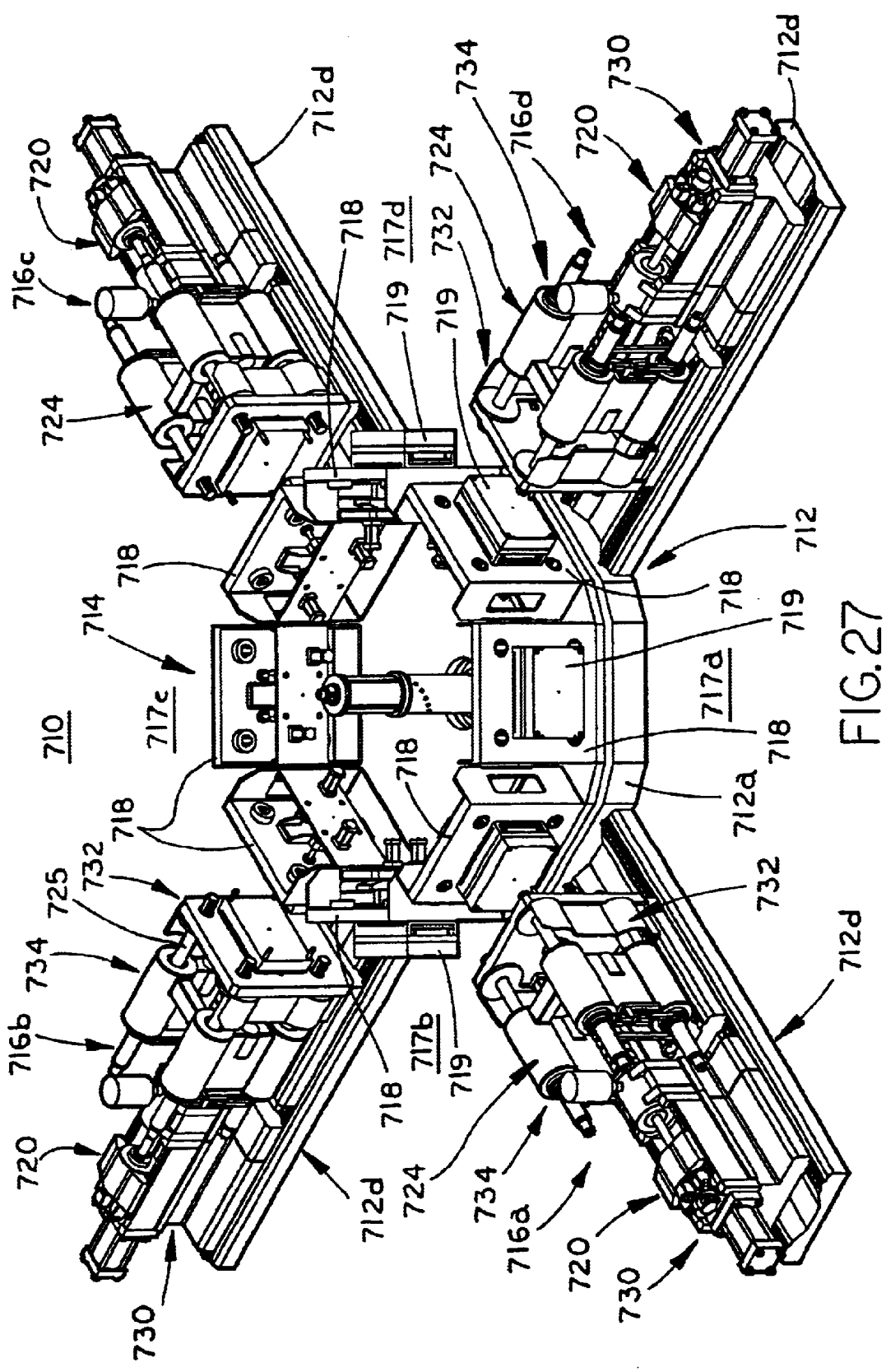

Referring now to FIGS. 26 and 27, mold apparatuses 610 and 710 are substantially similar to mold apparatuses 410 and 510, respectively, except that mold apparatus 610 and 710 include four movable mold modules 616a, 616b, 616c, 616d and 716a, 716b, 716c, 716d, respectively. A rotatable fixed platen support 614 provides five fixed platens 618 and corresponding mold parts 619, such that mold apparatus 610 is preferably useful for molding a portion of a four colored or four layered product at each of the four mold modules until the product is completed at the fourth module, and then accessing and removing the completed product at an access station 617 where there is no mold module aligned with the mold part of rotatable support 614.

Rotatable support 714 is similar to support 614, but includes eight fixed platens 718 and corresponding mold parts 719, which are alignable with the four mold modules 715a, 716b, 716c and 716d, and which are each further alignable with access stations 717a, 717b, 717c and 717d of mold apparatus 710. Because fixed platen support 714 provides an access station between each adjacent pair of the four mold modules 716a, 716b, 716c, 716d, mold apparatus 710 may be better suited for molding four separate products between the mold modules and respective mold parts 719 of fixed platen support 714. A separate product may be molded at each mold module 716a, 716b, 716c, 716d and then booked to an adjacent access station 717a, 717b, 717c, 717d at either side of the mold module for removal of the product. However, either mold apparatus 610 or mold apparatus 710 may be implemented as a four color or four layer molding apparatus for molding different portions or colors of a product at each mold module, or may be suited for use as four separate molding machines, which are operable simultaneously or separately to mold four separate products between the respective mold parts of the rotatable support and mold modules.

Although shown and described above as an injection molding machine, aspects of the present invention are equally applicable to other types of molding machines, such as a reaction injection molding (RIM) machine or a Structural Reaction Injection Molding (S-RIM) machines. Reaction injection molding machines typically involve injection of liquid material at lower pressures, such as fifty to ninety psi, into a mold cavity, whereby a chemical reaction within the mold cavity increases the pressure in order to form the molded part. Structural Rim or S-RIM molding machines function in a similar manner but at a higher pressure, to make a more rigid product, as is known.

Referring now to FIGS. 28–32, a reaction injection molding apparatus 810 includes a pair of pivotable and movable supports 814 and 816, which are movable along a base 812 and pivotable about respective, generally vertical axes relative to base 812. One of the movable supports 814 supports a reaction injection molding machine 820, which includes lance cylinders 821 and is operable to inject the liquid materials or chemicals into a mold cavity defined between a pair of mold parts 819 and 823 via conventional hoses and mixing chambers (not shown). Mold apparatus 810 is operable to mold substantially large parts, such as panels of vehicles or the like, and thus includes a plurality of tie rod assemblies 824 which are operable to tightly secure the mold parts together during the molding process, in order to prevent separation of the mold parts during the mold process as the pressure increases within the mold cavity.

Figure 28:
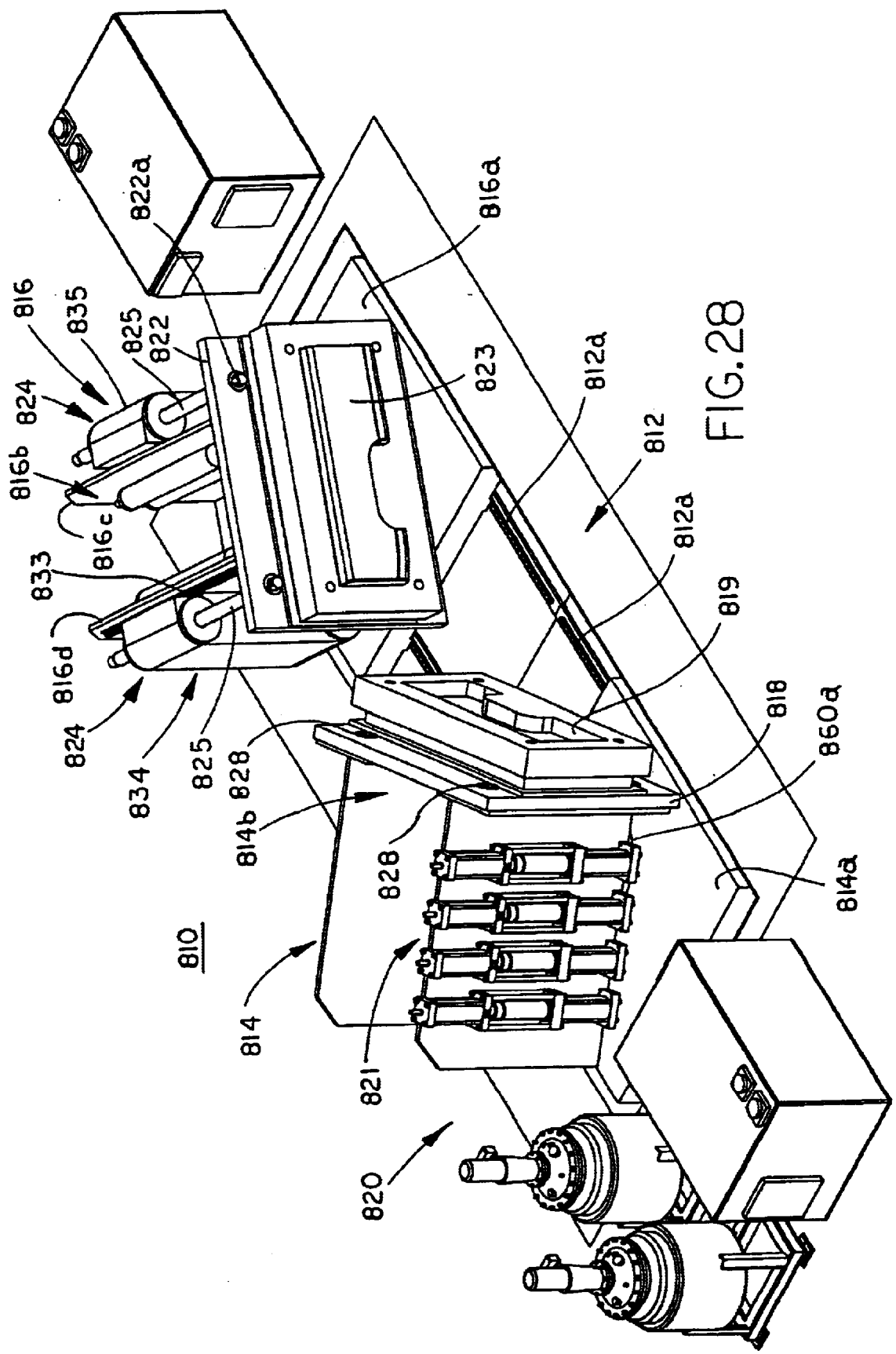
FIG. 28 is a rim injection molding machine in accordance with the present invention, with the platens booked for access thereto.
Figure 29:
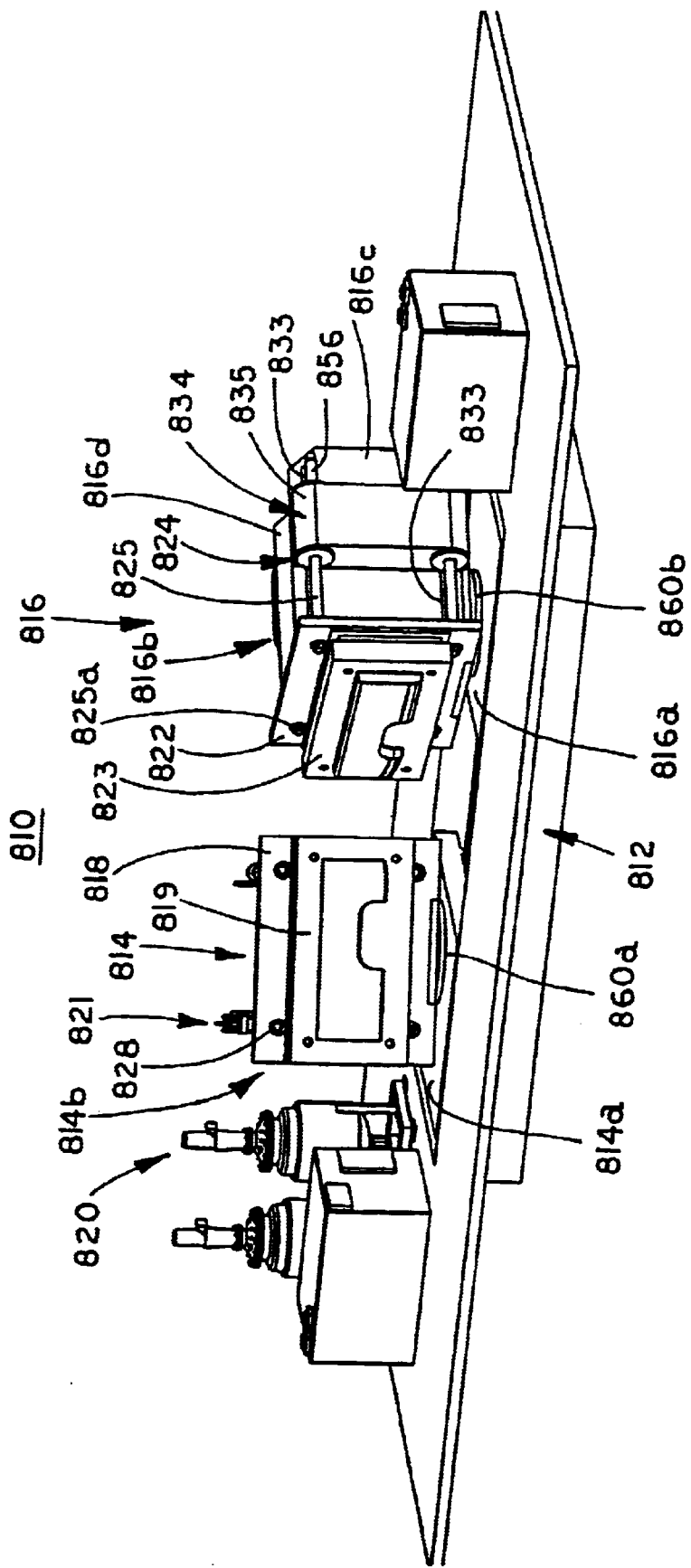
FIG. 29 is another perspective view of the rim injection molding machine of FIG. 28.
Figure 30:
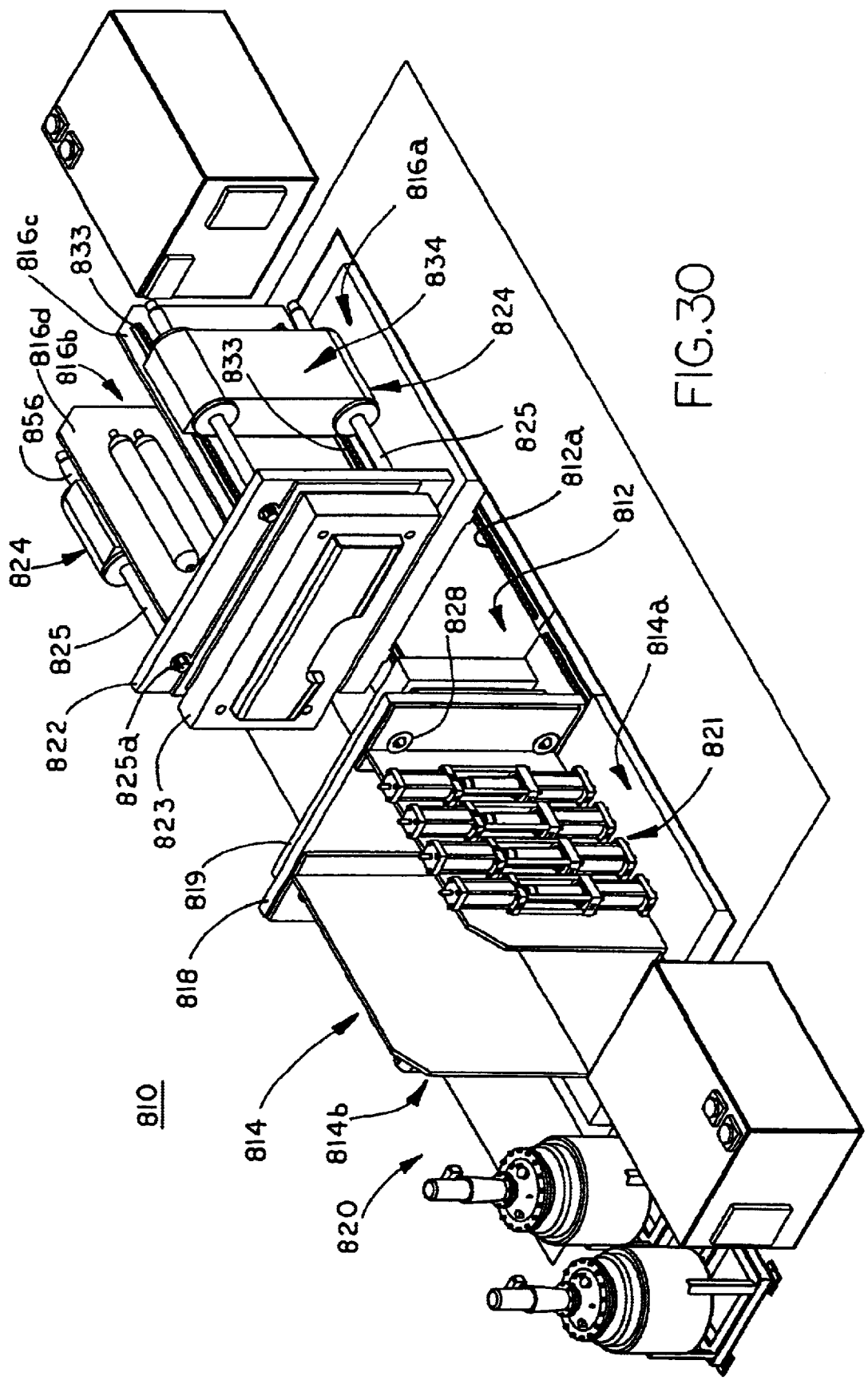
FIG. 30 is another perspective view of the rim injection molding machine of FIGS. 28 and 29, with the platens aligned.
Figure 31:
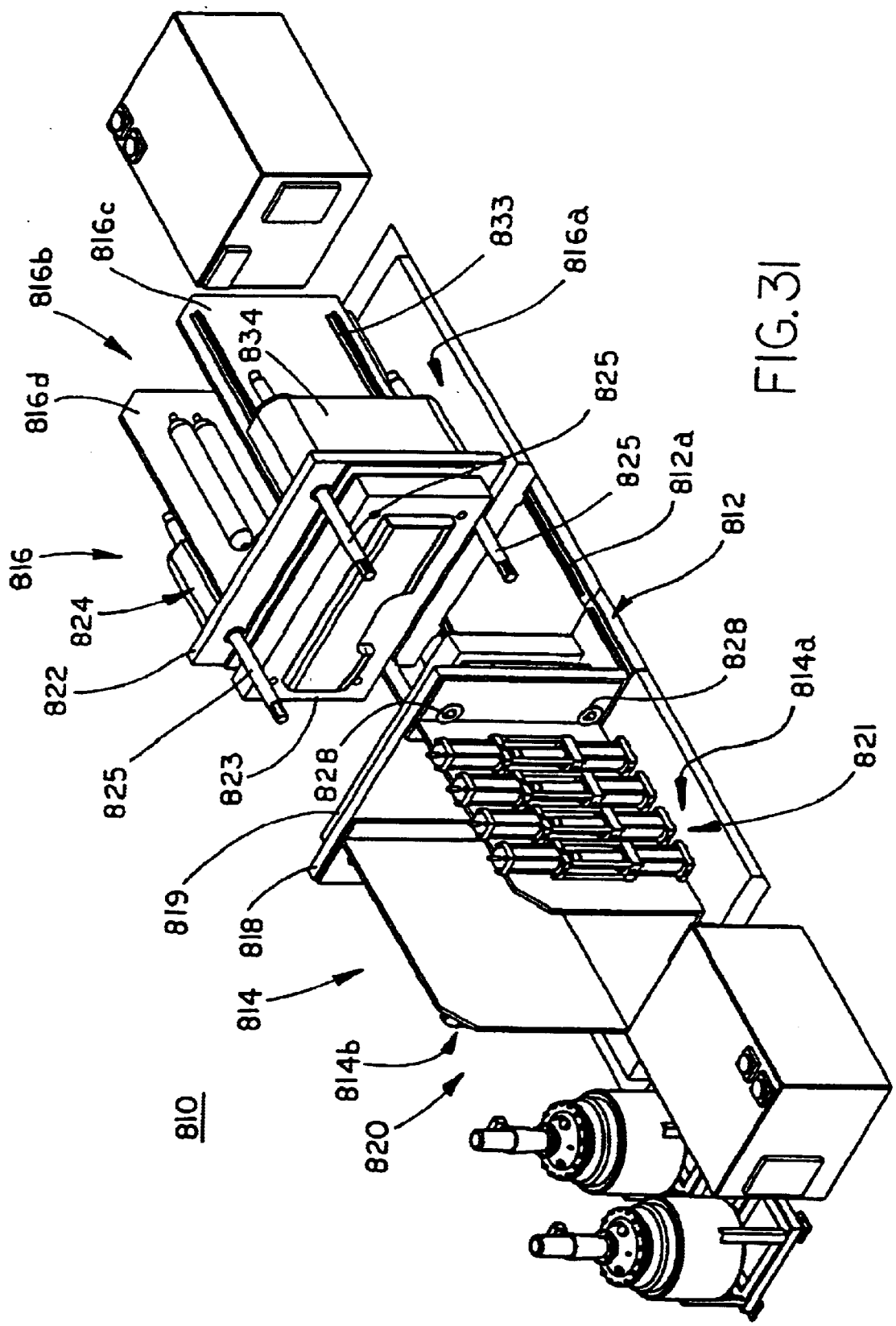
FIG. 31 is a perspective view similar to FIG. 30, with the tie rods extended from one of the platens.
Figure 32:
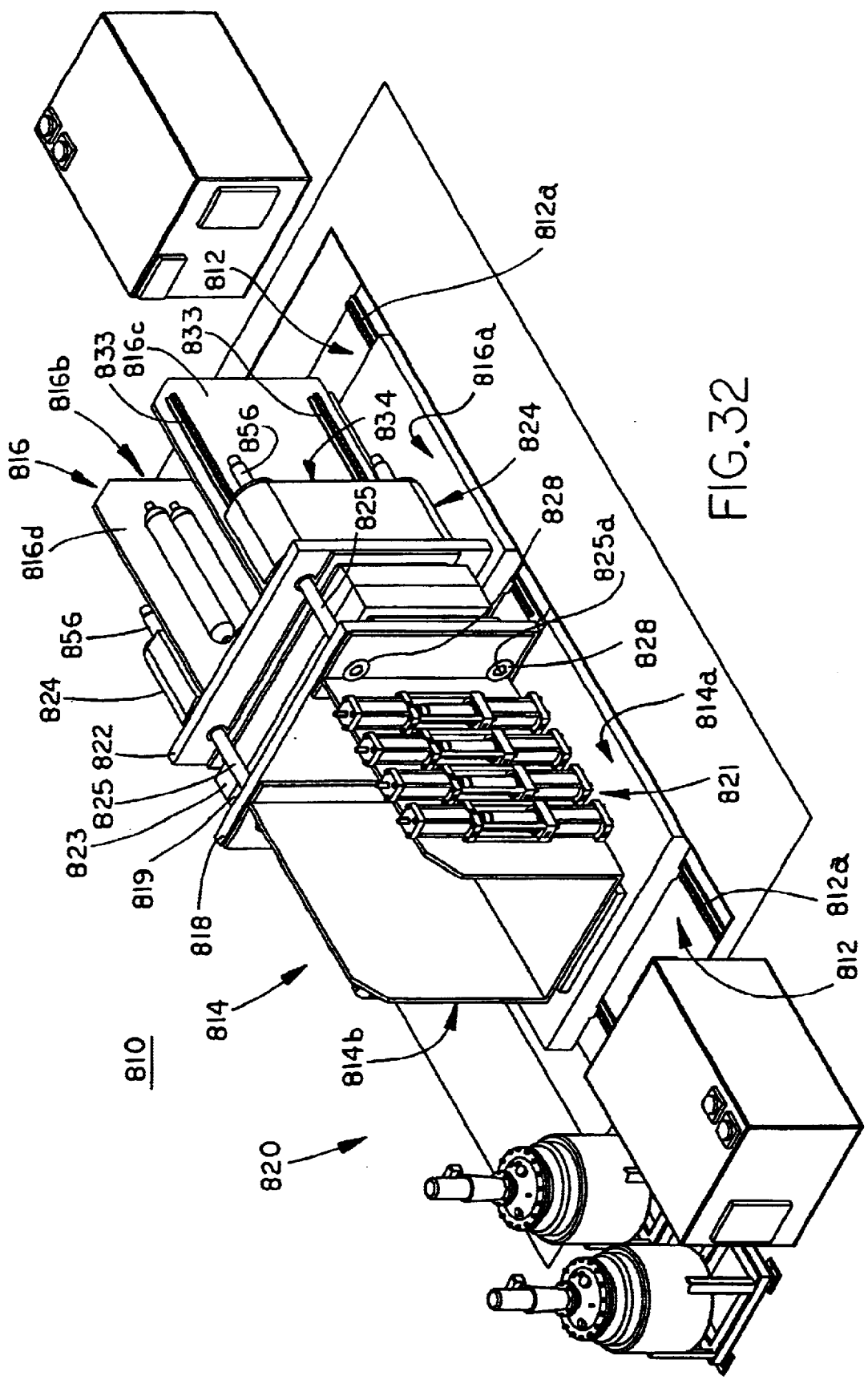
FIG. 32 is a perspective view similar to FIG. 31 of the rim injection molding machine of FIGS. 28–31, with the platens and mold parts engaged together and locked via engagement of the tie rods with the opposite platen for molding a product between the mold parts.

Preferably, movable support 814 includes a base 814a and generally vertical supports or walls 814b, which support the lance cylinders 821 and further support a platen 818 at one end thereof. Platen 818 further supports a corresponding mold part 819. Vertical support 814b is preferably pivotably or rotatably mounted to base 814a, such that platen 818 and mold part 819 may be swung or rotated relative to base portion 814a between a booked position, as shown in FIGS. 28 and 29, and an aligned or molding position, as shown in FIGS. 30–32. Base portion 814a is slidable toward and away from movable support 816 along rails 812b or other movable means of support base 812. Preferably, movement of platen support 814 along base 812 is accomplished via one or more actuators, such as hydraulic cylinders (not shown), mounted between base 812 and base portion 814a of platen support 814, such that extension or retraction of the actuator causes corresponding movement of platen support 814 along base 812. Preferably, vertical portion 814b is rotatably mounted to base portion 814a via a circular or ring shaped bearing member 860a (FIGS. 28 and 29), and may be rotated or indexed via any known rotational means, such as an electrical or hydraulic motor and corresponding gears or the like. Similar to fixed platen 18, as discussed above with respect to molding apparatus 10, platen 818 also includes a plurality of locking mechanisms 828, which are preferably partially threaded passageways 828c, similar to the locking mechanisms 828 discussed above.

Similarly, platen support 816 also includes a base portion 816a and a generally vertical support portion 816b, which has a platen 822 and corresponding mold part 823 mounted at an end thereof. Platen 822 includes a plurality of openings or passageways 822a positioned around mold part 823 for passage of tie rods 825 therethrough. Vertical support portion 816b is rotatably mounted to lower portion or base portion 816a via circular bearings 860b (FIG. 29) and may be rotated via any known means, similar to platen support 814 discussed above, such that platen 822 and mold part 823 are also pivotable or swung between and open or booked position (FIGS. 28 and 29) and a closed or aligned or molding position (FIGS. 30–32). Base portion 816a is also movable along rails 812b of support base 812, or via other movable means, such that platen 822 and mold part 823 are movable toward and away from platen 818 and mold part 819, such as via extension and retraction of an actuator (not shown), such as an hydraulic cylinder or the like.

Vertical support portion 816b preferably comprises a pair of generally vertical walls or supports 816c, 816d, each of which movably supports a corresponding tie rod carriage 834 thereon. Preferably, tie rod carriages 834 are slidable along corresponding rails 833 which extend along vertical support walls 816c, 816d. Each tie rod carriage 834 supports a pair of tie rod assemblies 824 within cylindrical support members 835. Tie rod assemblies 824 are substantially similar to tie rod assemblies 24, discussed above, such that a detailed discussion will not be included herein. Suffice it to say that tie rod assemblies 824 include a tie rod 825 which extends from one end of a hydraulic cylinder (not shown in FIGS. 28–32), while a rotatable shaft or cover 856 extends from the other end of the cylinder and is interconnected to tie rod 825 via a piston assembly (also not shown in FIGS. 28–32). Rotation of shaft 856 via a rotational device (not shown in FIGS. 28–32) causes a corresponding rotation of the piston assembly and tie rod 825, as discussed above. Likewise, as also discussed above, each tie rod 825 prefer-ably includes a partially threaded end 825a, which includes threaded portions and unthreaded portions, such that tie rods 825 may be non-rotatably inserted into corresponding shaped passageways 828c of locking mechanisms 828, and rotated therein to engage the threaded portions of tie rods 825 with corresponding threaded portions of locking mechanisms 828. However, other means for locking the tie rod to the opposite platen, such as a lock system similar to lock nut 27 and corresponding locking mechanisms 28', discussed above, may be implemented without affecting the scope of the present invention.

Similar to tie rod assemblies 24, discussed above, the piston assembly within each tie rod assembly 824 may be longitudinally adjusted within the cylinder via pressurized hydraulic fluid, in order to adjust an amount of extension of the tie rods 825 from the cylinders to accommodate variations in mold height or depth as different mold parts may be mounted to the platens for molding various products therebetween, and in order to clamp the mold parts tightly together during the molding process.

Accordingly, as shown in FIGS. 28 and 29, platen supports 814 and 816 maybe rotated relative to their base portions to pivot or swing the platens 818, 822 and respective mold parts 819, 823 outwardly to a booked position for easy access to both mold parts, in order to facilitate safe and easy removal of a molded product and cleaning or other servicing of the mold parts between molding processes. After the molded product has been removed from the mold parts, the upper portions 814b, 816b may be swung or rotated, either simultaneously or separately, to generally align the mold parts 819, 823 with one another, as shown in FIG. 30. As also shown in FIG. 30, the tie rod assemblies may remain retracted toward an end 816e of vertical support walls 816c, 816d, which is generally opposite platen 822, such that tie rods 825 are retracted and thus removed from the gap between the aligned mold parts 829 and 823. Once the mold parts are properly aligned, the rotatable portions 814b and 816b are preferably locked or pinned with respect to their base portions 814a and 816a, such that no relative rotation can occur therebetween, in order to maintain alignment of the mold parts during the engagement and molding processes.

As the mold part engagement process begins, platen supports 814 and 816 are movable generally toward one another along rails 812b of base 812, preferably while tie rod carriages 834 are simultaneously moved along rails 833 of vertical supports 816c, 816d, such that tie rods 825 engage locking members 828, while mold parts 819, 823 engage one another substantially simultaneously. However, the tie rods may be first extended via movement of tie rod carriages 834 along rails 833, prior to any movement of platen supports 814 or 816, as shown in FIG. 31, such that tie rods 825 are fully extended from platen 822, while the mold parts 819, 823 are still fully separated, without affecting the scope of the present invention. Alternately, the mold parts may be fully engaged via movement of one or both of the platen supports 814, 816 toward one another, prior to any movement of tie rod carriages 834 and thus extension of tie rods 825, without affecting the scope of the present invention.

As shown in FIG. 32, as the mold parts 819 and 823 are fully engaged together, tie rods 825 extend into locking members 828 and may be rotated to lock the platens relative to one another, such that the mold parts may not be separated during the molding process, as the pressure increases within the mold cavity. The injection material is then injected into the mold cavity and is allowed to harden therein. After a sufficient amount of time for the material to harden, the tie rods are rotated in the opposite direction to unlock the tie rods from the lock members, and the platen supports 814 and 816 are then moved in opposite directions to separate the mold parts 819 and 823, while the tie rod carriages 834 are preferably simultaneously moved toward end 816e of support walls 816c, 816d, to remove the tie rods from the gap that is now between the mold parts. After the mold parts are fully separated, one or both of the upper portions 814b, 816b of platen supports 814, 816 may be rotated relative to their respective base portions 814a, 816a, in order to open or book the mold parts for easy access thereto (FIGS. 28 and 29).

Figure 33:
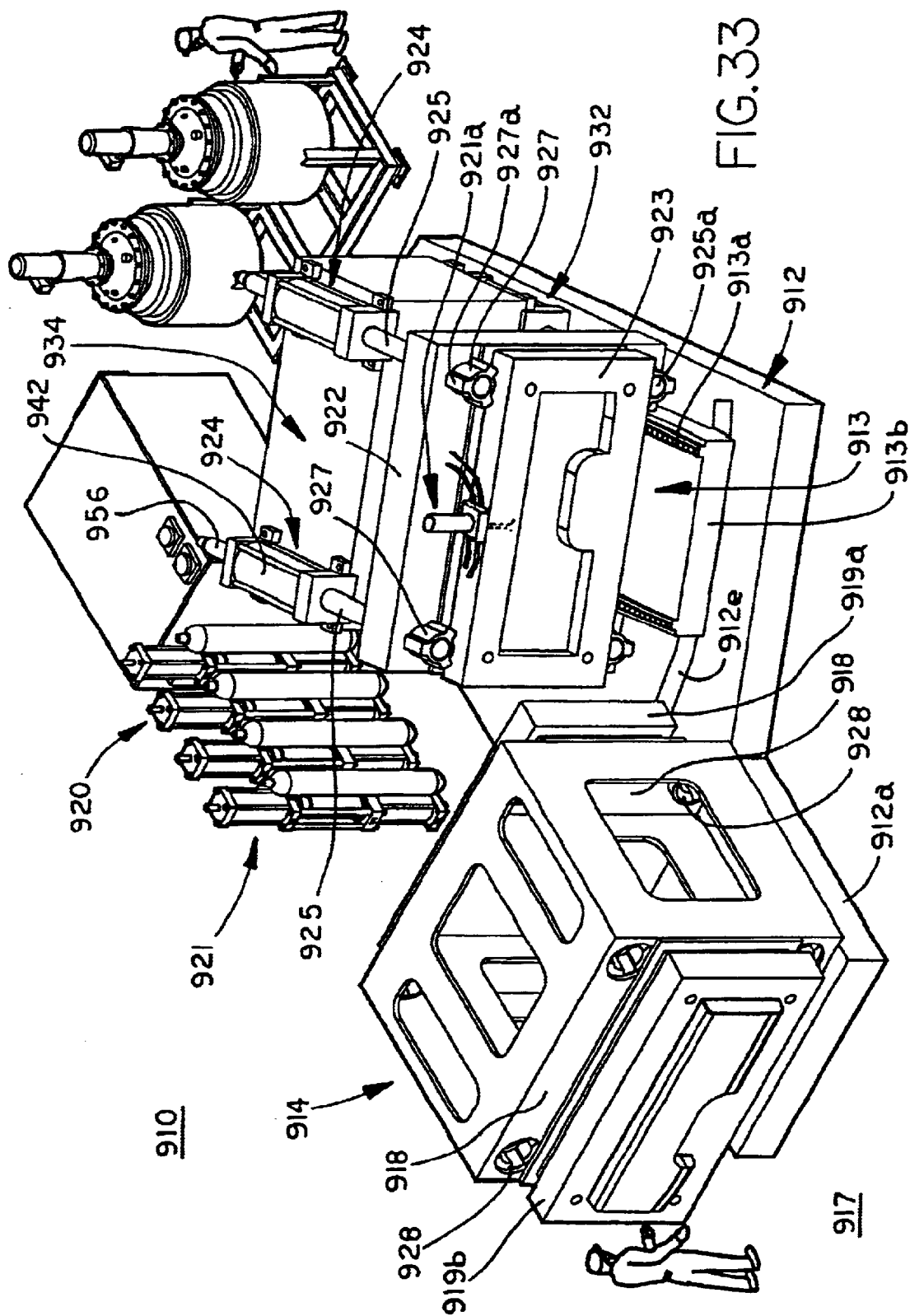
FIG. 33 is a perspective view of another embodiment of a rim injection molding machine in accordance with the present invention, with the injector module booked for access to the mold part thereof.
Figure 34:
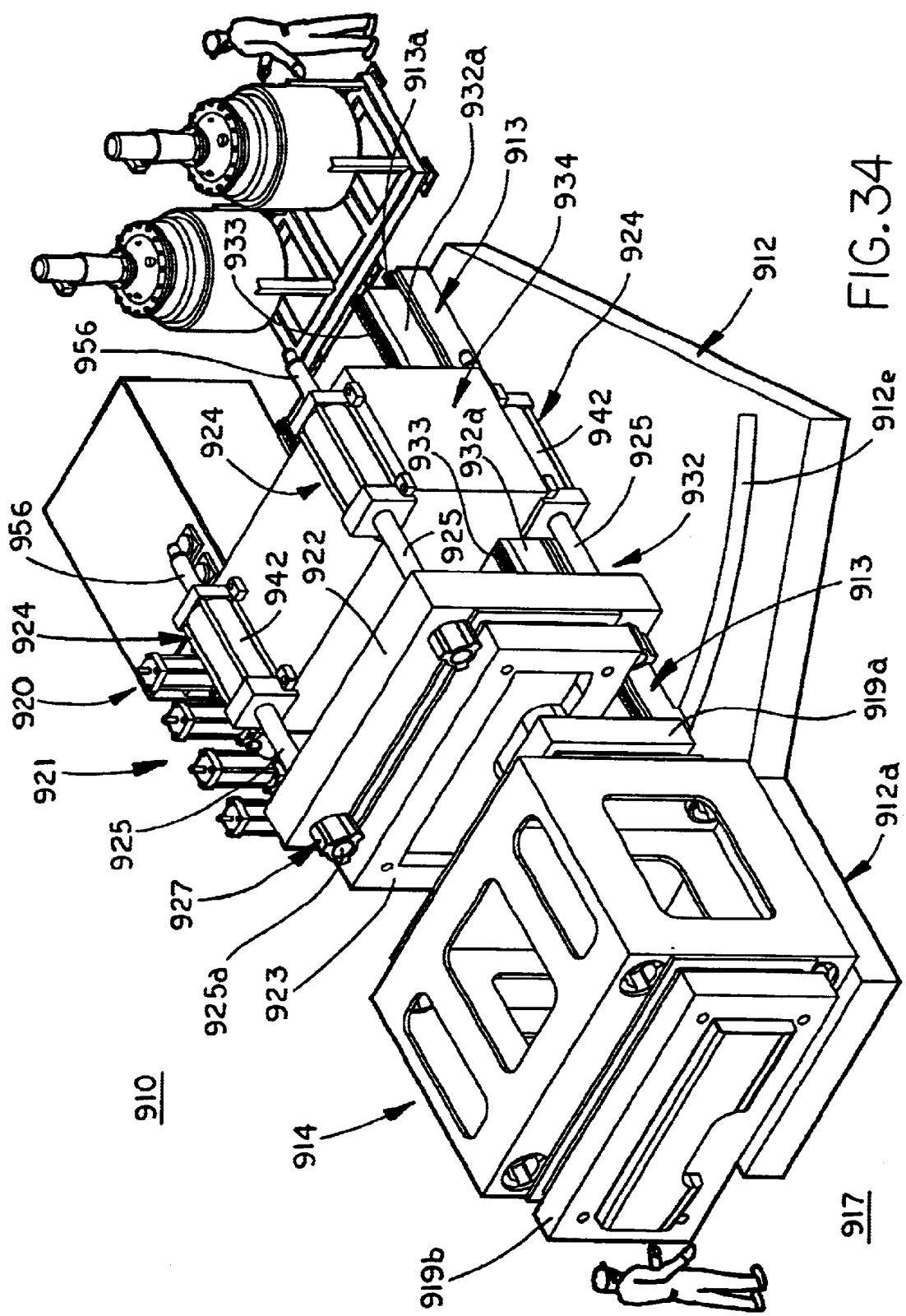
FIG. 34 is another perspective view of the molding machine of FIG. 33, with the injector module aligned with the mold part of the fixed platen support.
Figure 35:
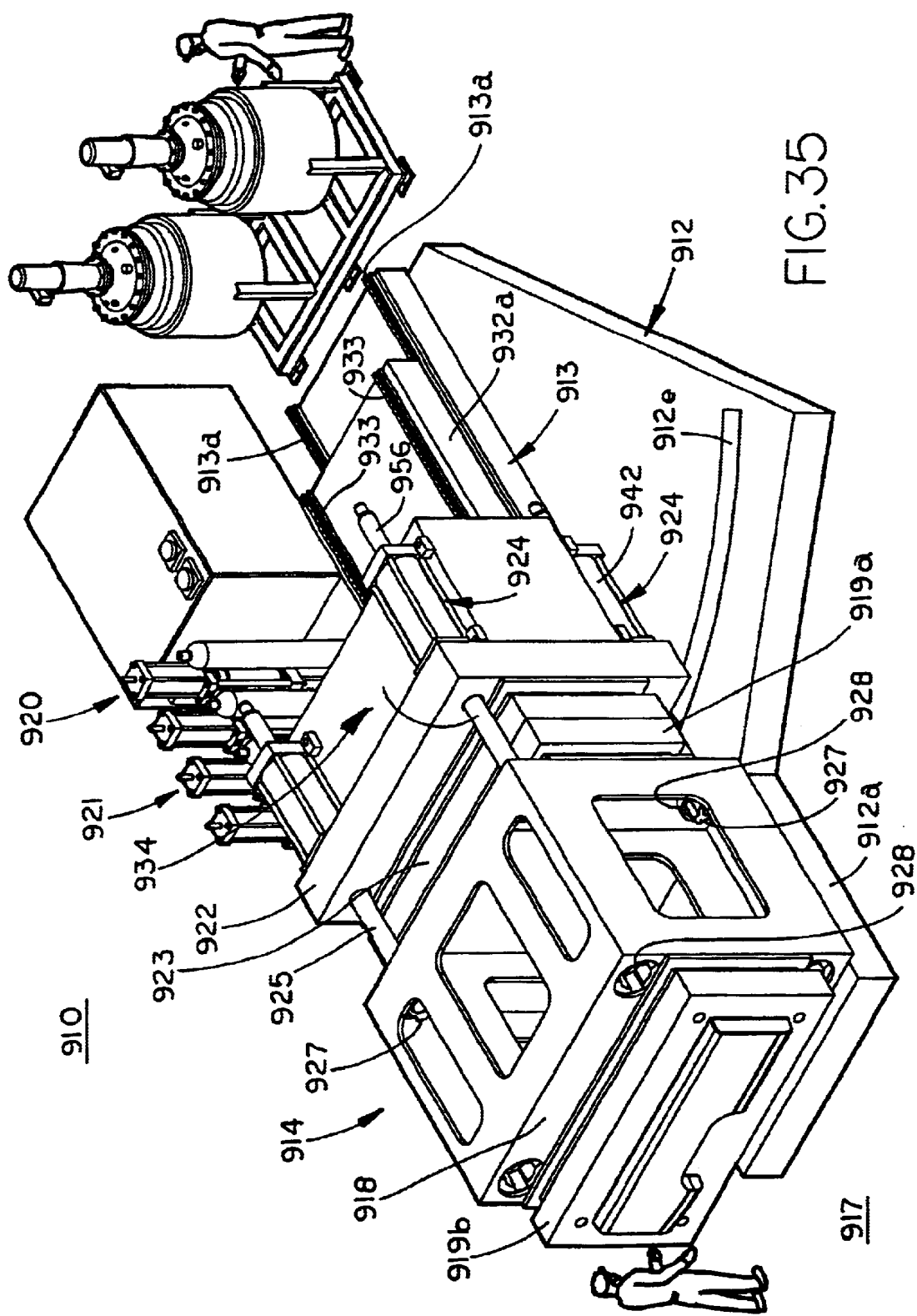
FIG. 35 is another perspective view of the molding machine of FIGS. 33 and 34, with the mold parts engaged and secured together by the tie rods.

Referring now to FIGS. 33–35, another reaction injection molding machine or apparatus 910 is shown and includes a pivotable or rotatable fixed platen support or turret 914 and a movable platen carriage or module 932. A reaction injection molding machine 920 is positioned at or nearby the movable module 932 and is operable to inject or communicate the appropriate chemicals to a mold cavity via conventional hoses and cylinders 921a (FIG. 33) in response to actuation of lance cylinders 921, as is known in the molding arts.

Similar to rotatable platen support 214, rotatable support 914 is rotatably mounted at a pedestal or portion 912a of a base 912 and is rotatable about a generally vertical axis. Rotatable support 914 includes a pair of fixed platens 918, each of which supports a corresponding mold part 919 thereon. Rotatable support 914 is rotatable or indexable to align one of the mold parts 919 with the movable module 932, while the other mold part 919 is booked or positioned away from the mold module 932 for easy access thereto, such as booked to an access station 917. Additionally, each fixed platen 918 further includes a plurality of locking members 928, which are preferably reinforced, noncylindrical passageways for receiving a correspondingly shaped end of the tie rods therethrough, similar to locking members 28', discussed above.

Movable platen module or carriage 932 is preferably slidable or otherwise movable along a support structure 913 via rails 913a or other movable means. Movable platen carriage 932 supports a movable platen 922 at an end thereof, which further supports a mold part 923 thereat. The cylinder/mixer and hoses 921a of reaction injection molding machine 920 preferably connect to mold part 923 at an upper end thereof, as shown in FIG. 33.

Support structure 913 is pivotally mounted at base 912, such that support 913 is pivotable or movable to book or otherwise move movable platen 922 and mold part 923 away from alignment with the mold part 919 and fixed platen 918, as shown in FIG. 33. Preferably, a forward end 913a of support 913 is movable along an accurate channel or groove 912e along an upper surface of base 912. Support 913 is then movable in an arcuate path along the channel 912e in response to actuation of an actuator or hydraulic cylinder (not shown) connected between support 913 and base 912. Support 913, and thus movable platen 922 and mold part 923, are thus movable between the booked position (FIG. 33) and an aligned position (FIGS. 34 and 35), in response to the actuator.

Movable platen carriage 932 movably supports a tie rod carriage 934, which includes a plurality of tie rods assemblies 924 positioned therearound. Tie rod carriage 934 is movable along rails 933 or the like along an upper surface of a base portion 932a of movable platen module 932. Similar to tie rod carriage 34, discussed above, tie rod carriage 934 is movable along movable platen carriage 932 while movable platen carriage 932 may be moved toward and away from fixed platen support 914, such that the tie rods 925 may be initially spaced from a gap between the mold parts when the movable platen carriage 932 is moved away from the fixed platen support 914, and then may be extended to bridge the gap via movement of tie rod carriage 934 along movable platen carriage 932 and movement of movable platen carriage 932 along support 913.

Preferably, tie rod assemblies 924 are substantially similar to tie rod assemblies 24, discussed above, such that a detailed discussion will not be repeated herein. The tie rod assemblies 924 include hydraulic cylinders 942 and tie rods 925 extending outwardly therefrom. Tie rods 925 are rotatable in response to rotation of a shaft or cover 956 extending from an opposite end of cylinders 942 in response to a rotational device, as discussed above. Preferably, tie rods 925 include a non-cylindrical shaped lock nut 927 secured at the end 925a of the rods 925. As discussed above with respect to lock nut 27, lock nut 927 includes three extensions 927a which extend radially outwardly from an end 925a of tie rods 925. As tie rods 925 are extended into and/or through locking members 928, lock nuts 927 extend through the correspondingly shaped passageways in the fixed platens 918 and are rotated via rotation of shaft 956 to engage the extensions 927a of the lock nuts 927 with an opposite surface 928d of the locking members 928. This prevents longitudinal movements of the tie rods 925 relative to the fixed platens 928, thereby securing the platens in the engaged position for the molding process. Alternately, tie rods 925 may include partially threaded ends, which may further engage partially threaded openings in the fixed platens, as discussed above with respect to tie rods 25 and locking members 28, without affecting the scope of the present invention.

Accordingly, molding apparatus 910 provides for efficient molding of multiple products, via booking and removal of a completed product, while simultaneously molding a second product between the opposite mold part 919 and mold part 923 of the movable carriage 932. More particularly, mold apparatus 910 allows for efficient molding of multiple parts and overlapping of processes. For example, a first mold part may be molded between movable mold part 923 and one of the fixed mold parts, such as mold part 919a. The movable carriage may be retracted along support 913 away from rotatable support 914, and rotatable support 914 may be rotated to pivot mold part 919a and the completed product to an access station 917, while providing an available mold part 919b for molding of a second product with the movable mold part 923. A second product may then be molded while the first product is removed from the mold part 919a. This process may be continued to provide simultaneous molding of and removal of molded products.

Additionally, it is sometimes appropriate to periodically check and clean the mold part 923 on the movable carriage 932. In such situations, support 913 may swing the movable platen carriage 932 outward from alignment with the rotatable support 914 for easy access to the mold part 923. This process may be performed while a first product is being removed from one of the mold parts 919b, and a second product is cooling in the other mold part 919a of the rotatable support 914. By the time the mold part 923 is cleaned and prepped for molding additional products, the first mold part 919b of the rotatable support 914 will likely also be ready for use, such that rotatable support 914 is rotated, while support 913 is pivoted, to again align the mold part 919b and 923 for subsequent molding for an additional product therebetween. Accordingly, the present invention provides for minimal down time of the molding apparatus, even in situations when the movable mold part 923 requires cleaning or other maintenance.

Therefore, the present invention provides a mold apparatus which includes a movable mold module and a movable and adjustable tie rod assembly. The tie rod assembly is easily adjusted for varying mold types or depths and is movable to extend and retract the tie rods between the gap between the platens of the molding apparatus. The tie rods are completely retractable to remove the tie rods from a gap between the platens of the mold apparatus when the platens have been separated. This substantially improves access to the mold parts between molding processes. The tie rods are also easily adjustable in length via adjustment of the piston assembly within the cylinder, in order to account for mold height or depth variation between various mold parts which may be installed on the platens of the mold apparatus. Additionally, tie rods are rotatable to lock the tie rods to the opposite platen for securing the platens relative to one another during the molding process. Preferably, all of the movable or controllable components of the molding machine and tie rod assemblies are mounted at the movable platen support or modules, while the corresponding locking member for the tie rods are mounted at an opposite platen, which may be fixed or pivotable and may even be movable as well. The locking members opposite the tie rods are preferably non-adjustable, fixed members or openings, which do not further require rotation or adjustment to engage and lock the tie rods in place at the opposite platens of the tie rod assemblies, since the tie rods are preferably rotatable to engage and lock to the respective locking members.

Additionally, the present invention provides a movable mold module, which includes the injector machine, the movable platen and the tie rod assemblies in a single movable carriage or module, which is movable along a base toward and away from a fixed platen. Accordingly, substantially all of the moving parts of the system may be provided on the mold module, while the fixed platen is a generally stationary member, with the exception of an ejector device attached thereto.

An additional benefit of the present invention is that the fixed platen support may be rotatable relative to the base, such that the mold part attached to the fixed platen may be booked or opened for easy and safe access thereto for product removal and/or cleaning or maintenance of the mold part. Additionally, multiple mold parts may be attached to multiple fixed platens at a single, rotatable, fixed platen support, such that one or more products may be molded, while another product is simultaneously being removed from one of the mold parts. Multiple mold modules may also be positioned around the rotatable platen support, such that multiple products may be molded simultaneously, or a portion of multi-colored or multi-layered or multi-material products may be molded, and the rotatable support may rotate or index the product or products from one mold station to the next, and then may further rotate to move the product to an opened or booked position for easy removal of the completely molded, multi-layered product from the corresponding mold part. This provides substantially improved mold times and efficiencies of the mold apparatus, while also allowing larger parts to be molded by the mold apparatus, since a greater area of the platens may be utilized for the mold parts and mold cavities.

Changes and modifications in the specifically described embodiments can be carried out without departing from the principles of the invention which is intended to be limited only by the scope of the appended claims, as interpreted according to the principles of patent law.

The embodiments of the invention in which an exclusive property right or privilege is claimed are defined as follows:

1. A mold assembly for molding products between a pair of mold parts comprising:

a support base;

a fixed platen support positioned at a first end of said support base, said fixed platen support including at least one fixed platen which supports one of the mold parts; and at least one movable mold module which is movably supported along said support base toward and away from said fixed platen support, said movable mold module comprising:

a movable platen carriage which supports a movable platen which supports the other of the mold parts, said movable platen carriage being movable along said support base toward and away from said fixed platen support, said movable platen being movable with said movable platen carriage between an engaged position, where the mold parts are engaged together for molding, and a separated position, where the mold parts and said platens are separated; and at least one tie rod assembly movably mounted at said movable platen carriage, said at least one tie rod assembly being movable with respect to said movable platen and said fixed platen, said tie rod assembly being initially removed from proximity of the mold parts when the mold parts and said platens are separated, said tie rod assembly being movable along said movable platen carriage to extend from said movable platen carriage for engaging said fixed platen support to maintain the engagement of the mold parts during molding, wherein said at least one tie rod assembly comprises a tie rod extending from a piston within an hydraulic cylinder, said cylinder being movable along said movable platen carriage.

2. The mold assembly of claim 1, wherein said movable platen carriage is movable along said support base with an injector carriage which supports an injector thereon.

3. The mold assembly of claim 2, wherein said injector carriage is separable from said movable platen carriage, said injector being pivotable about a generally vertical axis with respect to said injector carriage.

4. The mold assembly of claim 1, wherein said tie rod assembly moves along said movable platen carriage as said movable platen carriage is moving along said support base, such that the mold part of said movable platen and said at least one tie rod assembly engage the mold part of said fixed platen and said fixed platen, respectively, at substantially the same time.

5. The mold assembly of claim 1, wherein said tie rod and said piston are movable relative to said cylinder to adjust a length of said tie rod extending from said cylinder for a mold height adjustment.

6. The mold assembly of claim 1, wherein said piston and said tie rod are rotable to lock said tie rod said fixed platen when said tie rod assembly and said tie rod have been moved along said movable platen carriage to engage said fixed platen.

7. The mold assembly of claim 6, wherein said piston is rotable via a rotation device positioned at an end of said piston opposite said tie rod, said rotation device being mounted at and movable with said tie rod assembly.

8. The mold assembly of claim 1, wherein said fixed platen support is pivotably mounted to said first end of said support base and is pivotable about a generally vertical axis.

9. A mold assembly for molding products between a pair of mold parts comprising:
  a support base;
  a fixed platen support positioned at a first end of said support base, said fixed platen support including at least one fixed platen which supports one of the mold parts, said fixed platen support being pivotably mounted to said first end of said support base and being pivotable about a generally vertical axis; and
  at least one movable mold module which is movably supported along said support base toward and away from said fixed platen support, said movable mold module comprising:
    a movable platen carriage which supports a movable platen which supports the other of the mold parts, said movable platen carriage being movable along said support base toward and away from said fixed platen support, said movable platen being movable with said movable platen carriage between an engaged position, where the mold parts are engaged together for molding, and a separated position, where the mold parts and said platens are separated; and
    at least one tie rod assembly movably mounted at said movable plate carriage, said at least one tie rod assembly being movable with respect to said movable platen and said fixed platen, said tie rod assembly being initially removed from proximity of the mold parts when the mold parts and said platens are separated, said tie rod assembly being movable along said movable platen carriage to extend from said movable platen carriage for engaging said fixed platen support to maintain the engagement of the mold parts during molding, wherein said fixed platen support includes at least two fixed platens and is pivotable to align one of said fixed platens with said movable platen while allowing access to the other of said fixed platens.

10. The mold assembly of claim 9, wherein said at least one movable mold module comprises at least two movable mold modules, said fixed platen support being pivotable to align said fixed platens with a corresponding one of said at least two movable mold modules.

11. The mold assembly of claim 10, wherein said fixed platen support is pivotable to pivot a molded product from one of said movable mold modules to a next of said movable mold modules, whereby a different color of the molded product is molded by each of said movable mold modules and one of said fixed platens.

12. The mold assembly of claim 10, wherein said movable platen carriage is pivotable between an aligned orientation, where at least one of said fixed platens and respective mold parts are aligned with at least one of said movable platens and respective mold parts, and a booked position, where at least one of said fixed platens and respective mold part are pivoted away from alignment with at least one of said movable platens and respective mold parts.

13. The mold assembly of claim 10, wherein said at least one tie rod assembly comprises a tie rod extending from a piston within a hydraulic cylinder, said cylinder being movable along said movable platen carriage, said piston and said tie rod being rotable to lock said tie rod to said fixed platen when said tie rod assembly and said tie rod have been moved along said movable platen carriage to engage said fixed platen.

14. The mold assembly of claim 1, wherein said support base is pivotably mounted to a fixed base and is pivotable to move said movable mold module between an aligned position, where said movable platen is aligned with said fixed platen, and a booked position, where said movable platen is pivoted away from alignment with said fixed platen.

15. A molding assembly for molding item with a molding machine, said molding assembly comprising:
  a support base;
  at least one movable platen which is movable along at least one portion of said support base; and
  a fixed platen support structure which supports at least two fixed platens, said fixed platen support structure being pivotable mounted to said support base about a generally vertical axis and being pivotable to align at least one of said at least two fixed platens with said at least one movable platen, another of said at least two fixed platens being aligned with one of another movable platen and an access station.

16. The molding assembly of claim 15, wherein said at least one movable platen is mounted to at least one movable carriage which is movable along said at least one portion of said base, each of said at least one movable carriage including the molding machine.

17. The molding assembly of claim 16 further including at least one tie rod which is engagable between said at least one movable platen and at least one of said at least two fixed platens to secure said platens relative to one another during the molding process.

18. The molding assembly of claim 17, wherein said at least one tie rod is mounted at said movable carriage and is extendable and retractable relative to said movable platen between an extended position, where said tie rod is engagable with said fixed platen, and a retracted position, where said tie rod is retracted and remote from a gap between said movable and fixed platens when said movable carriage is retracted away from said fixed platen support.

19. The molding assembly of claim 18, wherein said at least one tie rod extends from a tie rod piston which is movable within an hydraulic cylinder, said cylinder being movably mounted at said movable platen and movable relative thereto to extend and retract said tie rod relative to said movable and fixed platens.

20. The molding assembly of claim 19, wherein said tie rod piston is rotatable to rotate said tie rod to lock said tie rod to said fixed platen after said tie rod is extended through a portion of said fixed platen.

21. The molding assembly of claim 15, wherein said support base is pivotably mounted to a fixed base and is pivotable to move said movable platen between an aligned position, where said movable platen is aligned with one of said at least two fixed platens, and a booked position, where said movable platen is pivoted away from alignment with said at least two fixed platens.

22. The molding assembly of claim 15, wherein said at least one movable platen comprises at least two movable platens, each of said movable platens being movable along a different portion of said support base toward and away from said fixed platen support.

23. The molding assembly of claim 22, wherein said fixed platen support is pivotable to pivot one of said fixed platens from one of said at least two movable platens to another of said movable platens, whereby a different layer or portion of an item being molded by said molding assembly is molded at each of said movable platens.

24. The molding assembly of claim 22, wherein said fixed platen support is pivotable to pivot at least one of said fixed platens from being aligned with one of said at least two movable platens to a booked position at said access station for access to said at least one of said fixed platens.

25. A method for molding one or more products with multiple molding machines comprising:

providing a molding apparatus having a base, a fixed platen support which is pivotally mounted at said base, and first and second movable platens movably mounted at a respective portion of said base and movable therealong toward and away from said fixed platen support, said fixed platen support having first and second fixed platens and being pivotable about a generally vertical axis;

pivoting said fixed platen support to align said first fixed platen with said first movable platen;

molding a first product between said first movable platen and said first fixed platen;

pivoting said fixed platen support to move said first fixed platen and the first product from alignment with said first movable platen; and molding a second product between said second movable platen and one of said first fixed platen and said second fixed platen.

26. The method of claim 25, wherein the step of pivoting said fixed platen support to move the first product includes pivoting said fixed platen support to move the first product to an access station for removal of the first product from said first fixed platen.

27. The method of claim 26, wherein the steps of molding the first and second products are performed generally simultaneously, said method includes pivoting said fixed platen support to move the first and second products from alignment with said first and second movable platens, respectively, to respective access stations for removal of the first and second products.

28. The method of claim 25, wherein the first product is a first portion of a product and the second product is a second portion of the product molded between said second movable platen and said first fixed platens, said step of pivoting said fixed platen support to move the first product including pivoting said fixed platen support to move the first portion of the product to align with said second movable platen.

29. The method of claim 28, wherein after the step of molding the second product, said method includes pivoting said fixed platen support to move said first fixed platen and the first and second portions of the product away from alignment with said first and second movable platens for removal of the molded product.

30. The method of claim 29 further including molding a first portion of another product between said first movable platen and said second fixed platen while the second portion of the product is molded between said second movable platen and said first fixed platen.

31. The method of claim 30 further including molding a second portion of the other product between said second movable platen and said second fixed platen while the first portion of the product is molded between said first movable platen and said first fixed platen.

32. The method of claim 25, wherein each of said movable platens is mounted on a movable mold module which includes a molding machine and is movable along the respective portion of said base.

33. The method of claim 32, wherein prior each step of molding the first or second products, said method includes moving at least one tie rod assembly at said movable mold module to lock said movable platens and said fixed platens together for molding a respective portion of the item.

34. The method of claim 32, wherein prior to molding the first product, said method further includes:

moving said first movable platen support toward said fixed platen support to engage said first movable platen with said first fixed platen;

moving a tie rod assembly relative to said first movable platen support to engage a tie rod of said first tie rod assembly with said first fixed platen; and rotating said tie rod to lock said tie rod and said first movable platen relative to said first fixed platen.

35. The method of claim 34, wherein prior to moving said first movable platen support, said method further includes:

adjusting an amount of extension of said tie rods relative to said movable platens by moving a piston within a cylinder of at least one tie rod assembly to adjust an amount of extension of said tie rods from said cylinders, said tie rod extending from said piston.

36. A mold assembly for molding items with a molding machine comprising:

a first platen and a second platen, said first and second platens being oppositely facing and supporting a respective mold part thereon, at least one of said first and second platens being movable relative to the other between an engaged position, for molding an item between the mold parts with the molding machine, and a retracted position, whereby a gap is between said platens and the mold parts; and at least one tie rod assembly, each of said at least one tie rod assembly having an hydraulic cylinder movably mounted at said first platen, said hydraulic cylinder having a piston which is movable along said cylinder, said piston including a tie rod extending from one end of said piston, said piston of said cylinder being longitudinally adjustable relative to said cylinder to adjust an amount of extension of said tie rod from said cylinder to account for a separation and thickness of said first and second platens when in the engaged position, said cylinder and said tie rod being initially retracted and remote from said gap when said platens are in the retracted position, said cylinder being movable relative to said first platen to move said tie rod to an extended position whereby said tie rod is moved toward said second platen, said tie rod being rotatable to lock said tie rod to said second platen when said first and second platens are in the engaged position and said cylinder has been moved to engage said tie rod with said second platen.

37. The mold assembly of claim 36, wherein said second platen is generally fixedly mounted to a base and said first platen is mounted to a movable support which is movable along said base, said movable support being movable to move said first platen between the separated position and the engaged position with respect to said second platen, said cylinder of said tie rod assembly being movably mounted to, said movable support.

38. The mold assembly of claim 37, wherein said movable support includes a movable injector support which supports the molding machine thereon and is movable with said first platen along said base.

39. The mold assembly of claim 36, wherein said first platen is mounted to a movable support which is movably mounted to a support structure and is movable along said support structure toward and away from said second platen.

40. The mold assembly of claim 39, wherein said support structure is pivotably mounted to a base and is pivotable to move said first platen between an aligned position, where said first platen is aligned with said second platen, and a booked position, where said first platen is moved from alignment with said second platen.

41. The mold assembly of claim 36, wherein said piston is rotatable via a rotation device positioned at an end of said piston opposite said tie rod, said rotation device being mounted at said hydraulic cylinder.

42. The mold assembly of claim 36, wherein said tie rod includes a partially threaded end which is insertable through a correspondingly shaped and partially threaded opening in said second platen, said tie rod being rotatable to lock said tie rod at said second platen via engagement of threads at said threaded end with a threaded portion of said correspondingly shaped and partially threaded opening in said second platen.

43. The m old assembly of claim 36, wherein said tie rod includes a non cylindrical nut which is insertable through a correspondingly shaped opening in said second platens said tie rod being rotatable to lock said tie rod at said second platen via engagement of said nut with an opposite side of said second platen.

* * * * *

UNITED STATES PATENT AND TRADEMARK OFFICE
CERTIFICATE OF CORRECTION

PATENT NO. : 6,613,262 B1  
DATED : September 2, 2003  
INVENTOR(S) : Donald P. Arend It is certified that error appears in the above-identified patent and that said Letters Patent is hereby corrected as shown below:

Column 10,
Line 16, delete "and" after "hollow".

Column 24,
Line 58, "rotable" should be -- rotatable --.
Line 58, insert -- to -- after "rod" in the second occurrence.
Line 63, "rotable" should be -- rotatable --.

Column 25,
Line 24, "plate" should be -- platen --.
Line 54, "part" should be -- parts --.
Line 61, "rotable" should be -- rotatable --.

Column 26,
Line 5, "item" should be -- items --.
Line 12, "pivotable" should be -- pivotably --.

Signed and Sealed this

Sixth Day of September, 2005

JON W. DUDAS
*Director of the United States Patent and Trademark Office*